(12) United States Patent
Hamkins et al.

(10) Patent No.: US 8,358,723 B1
(45) Date of Patent: Jan. 22, 2013

(54) SELF-CONFIGURABLE RADIO RECEIVER SYSTEM AND METHOD FOR USE WITH SIGNALS WITHOUT PRIOR KNOWLEDGE OF SIGNAL DEFINING CHARACTERISTICS

(75) Inventors: Jon Hamkins, La Crescenta, CA (US); Marvin K. Simon, La Canada, CA (US); Dariush Divsalar, Pacific Palisades, CA (US); Samuel J. Dolinar, Sunland, CA (US); Andre Tkacenko, Pasadena, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 1767 days.

(21) Appl. No.: 11/602,440

(22) Filed: Nov. 10, 2006

Related U.S. Application Data

(60) Provisional application No. 60/736,880, filed on Nov. 12, 2005.

(51) Int. Cl.
*H04L 27/38* (2006.01)
(52) U.S. Cl. ...................................................... 375/341
(58) Field of Classification Search .................. 375/316, 375/340–341; 329/300, 311, 315–316, 318, 329/320, 345, 347–348; 714/786, 795–796
See application file for complete search history.

(56) References Cited

U.S. PATENT DOCUMENTS

| | | | |
|---|---|---|---|
| 5,673,291 A * | 9/1997 | Dent ............................. | 375/262 |
| 6,034,623 A | 3/2000 | Wandel | |
| 6,052,600 A | 4/2000 | Fette et al. | |
| 6,091,765 A | 7/2000 | Peitzold, III et al. | |
| 6,205,185 B1 | 3/2001 | Kajiwara | |
| 6,353,640 B1 | 3/2002 | Hessel et al. | |
| 6,400,928 B1 * | 6/2002 | Khullar et al. ............. | 455/67.11 |
| 6,463,107 B1 * | 10/2002 | Lindoff et al. ................. | 375/343 |
| 6,546,045 B1 * | 4/2003 | Benson, Jr. .................... | 375/222 |
| 6,594,273 B1 | 7/2003 | McGibney | |
| 6,603,983 B2 | 8/2003 | Hildebrand | |
| 6,628,706 B1 * | 9/2003 | Lindoff ......................... | 375/231 |
| 6,647,098 B2 * | 11/2003 | Sakai et al. ................ | 379/93.01 |
| 6,690,746 B1 * | 2/2004 | Sills et al. ..................... | 375/316 |
| 6,721,303 B1 | 4/2004 | Menzel et al. | |

(Continued)

FOREIGN PATENT DOCUMENTS

WO 97/08843 3/1997
WO 99/23760 5/1999

OTHER PUBLICATIONS

Xu et al., Likelhood Function-Based Modulation Classification in Bandwidth-Constrained Sensor Networks, 2010, Networking, Sensing and Control (ICNSC), 2010 International Conference on, pp. 530-533.*

(Continued)

*Primary Examiner* — Lawrence B Williams
(74) *Attorney, Agent, or Firm* — Mark Homer

(57) ABSTRACT

A method, radio receiver, and system to autonomously receive and decode a plurality of signals having a variety of signal types without a priori knowledge of the defining characteristics of the signals is disclosed. The radio receiver is capable of receiving a signal of an unknown signal type and, by estimating one or more defining characteristics of the signal, determine the type of signal. The estimated defining characteristic(s) is/are utilized to enable the receiver to determine other defining characteristics. This in turn, enables the receiver, through multiple iterations, to make a maximum-likelihood (ML) estimate for each of the defining characteristics. After the type of signal is determined by its defining characteristics, the receiver selects an appropriate decoder from a plurality of decoders to decode the signal.

14 Claims, 31 Drawing Sheets

U.S. PATENT DOCUMENTS

| | | | |
|---|---|---|---|
| 6,831,574 B1 * | 12/2004 | Mills et al. | 341/50 |
| 6,842,613 B2 | 1/2005 | Mittal | |
| 6,967,598 B2 * | 11/2005 | Mills | 341/50 |
| 7,190,737 B2 * | 3/2007 | Okamoto | 375/286 |
| 7,218,690 B2 * | 5/2007 | Learned | 375/341 |
| 7,321,644 B2 * | 1/2008 | Love et al. | 375/341 |
| 7,415,078 B2 * | 8/2008 | Smit | 375/330 |
| 7,430,257 B1 * | 9/2008 | Shattil | 375/347 |
| 2002/0101846 A1 | 8/2002 | Erben et al. | |
| 2003/0012310 A1 * | 1/2003 | Nagayasu | 375/341 |
| 2003/0231728 A1 | 12/2003 | Phang et al. | |
| 2004/0058661 A1 | 3/2004 | Hsu et al. | |
| 2004/0072594 A1 * | 4/2004 | Hwang et al. | 455/562.1 |
| 2004/0081260 A1 * | 4/2004 | Matsusaka | 375/340 |
| 2004/0097219 A1 | 5/2004 | Lee | |
| 2004/0242261 A1 | 12/2004 | Fette | |
| 2004/0248534 A1 | 12/2004 | Meyer | |
| 2005/0063487 A1 * | 3/2005 | Sayegh | 375/316 |
| 2005/0169229 A1 * | 8/2005 | Cho et al. | 370/344 |
| 2006/0115013 A1 * | 6/2006 | Kim et al. | 375/262 |

OTHER PUBLICATIONS

Rakhshanfar et al., Maximum Likelihood Approach to Classification of Digitally Frequency-Modulated Signals, 2010, Wireless Communication Systems (ISWCS), 2010 7th International Symposium on, pp. 761-764.*

Xu et al., Software Defined Radio Equipped With Rapid Modulation Recognition, Vehicular Technology, IEEE Transactions on, May 2010, Volume: 59, Issue: 4, pp. 1659-1667.*

Hamkins, Modulation Clssification of MPSK for Space Applications, 2006, Global Telecommunications Conference, 2006. GLOBECOM, '06. IEEE, pp. 1-5.*

Simon et al., Data Format Classification for Autonomous Software Defined Radios, 2005, Military Communications Conference,2005. MILCOM 2005. IEEE, vol. 1, pp. 386-392.*

* cited by examiner

SELF-CONFIGURABLE RADIO RECEIVER SYSTEM AND METHOD FOR USE WITH SIGNALS WITHOUT PRIOR KNOWLEDGE OF SIGNAL DEFINING CHARACTERISTICS

CROSS-REFERENCE TO RELATED APPLICATIONS

The present application derives priority from U.S. Provisional Application No. 60/736,880 filed 12 Nov. 2005.

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND a. Field of Invention

The invention relates to radio receivers and, more particularly, to an autonomous radio receiver capable of receiving a signal without a priori knowledge about the defining characteristics of the signal, recognizing these characteristics directly from the received signal, and appropriately decoding the signal based on the signal type.

b. Background of the Invention

Conventional radio receivers typically have complete prior knowledge of the defining characteristics of signals they are designed to receive. Because conventional radio receivers know what type of signal they are going to receive they are typically hardwired or manually configured to do so. Conversely, conventional radio receivers are incapable of receiving signal types different from that which they were intended for. In some cases where they do have such capability, conventional radio receivers require specific pre-configuration according to a pre-determined schedule. Thus, conventional radio receivers are capable of only receiving pre-determined/pre-programmed types of signals. For example, cellular telephones are designed according to several different standards, and single-mode telephones are typically preconfigured to receive only one type of cellular telephony signal. Indeed, a single-mode telephone configured to use Code Division Multiple Access (a popular system in the United States) is unable to receive a signal using Global Systems Mobile (GSM) signals, which is the European standard. While there are dual-mode telephones to solve the CDMA/GSM dichotomy, there remains the issue and potential future issue of varying frequency bands, data rates, modulation types, modulation indices, pulse shapes, and so on, which may affect the usability of cellular telephones. Therefore, there is a need for a system capable of receiving multiple signal types without a priori knowledge about the defining characteristics of the signals, and accurately recognizing defining features of the incoming signals and respond intelligently without explicit pre-configuration or reprogramming to define the functions of the receiver. In other words, there is a need for a system capable of recognizing multiple signal types and autonomously reconfiguring itself to decode the particular type of signal that is received.

SUMMARY OF THE INVENTION

It is, therefore, an object of the present invention to provide a system for autonomously receiving and decoding a plurality of signals having a variety of signal types without prior knowledge of the defining characteristics of the signals.

According to the present invention, the above-described and other objects are accomplished by providing a system inclusive of hardware and a suite of software modules to autonomously recognize various defining characteristics of a signal that are unknown prior to reception. Some of these defining characteristics include, but are not limited to, the angle of arrival, data rate, symbol timing, carrier frequency and phase, modulation index, modulation type, signal-to-noise ratio (SNR), code type, and decoded message bits. The signal characteristics are recognized by estimating one or more characteristics of the signal, and the estimated characteristic is utilized to enable the apparatus and system to determine other defining characteristics. Through multiple iterations of estimation and calculation, the system is able to make a maximum-likelihood (ML) or near-ML estimate for each of the defining characteristics. The ML estimates assist in identifying the type of signal and the system selects an appropriate decoder from a plurality of decoders to eventually decode the signal.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE PREFERRED EMBODIMENT

The present invention is an autonomous radio receiver capable of receiving a signal without prior knowledge about the defining characteristics of the signal, instead recognizing these characteristics directly from the received signal, and appropriately decoding the signal based on the signal type.

Figure 1:
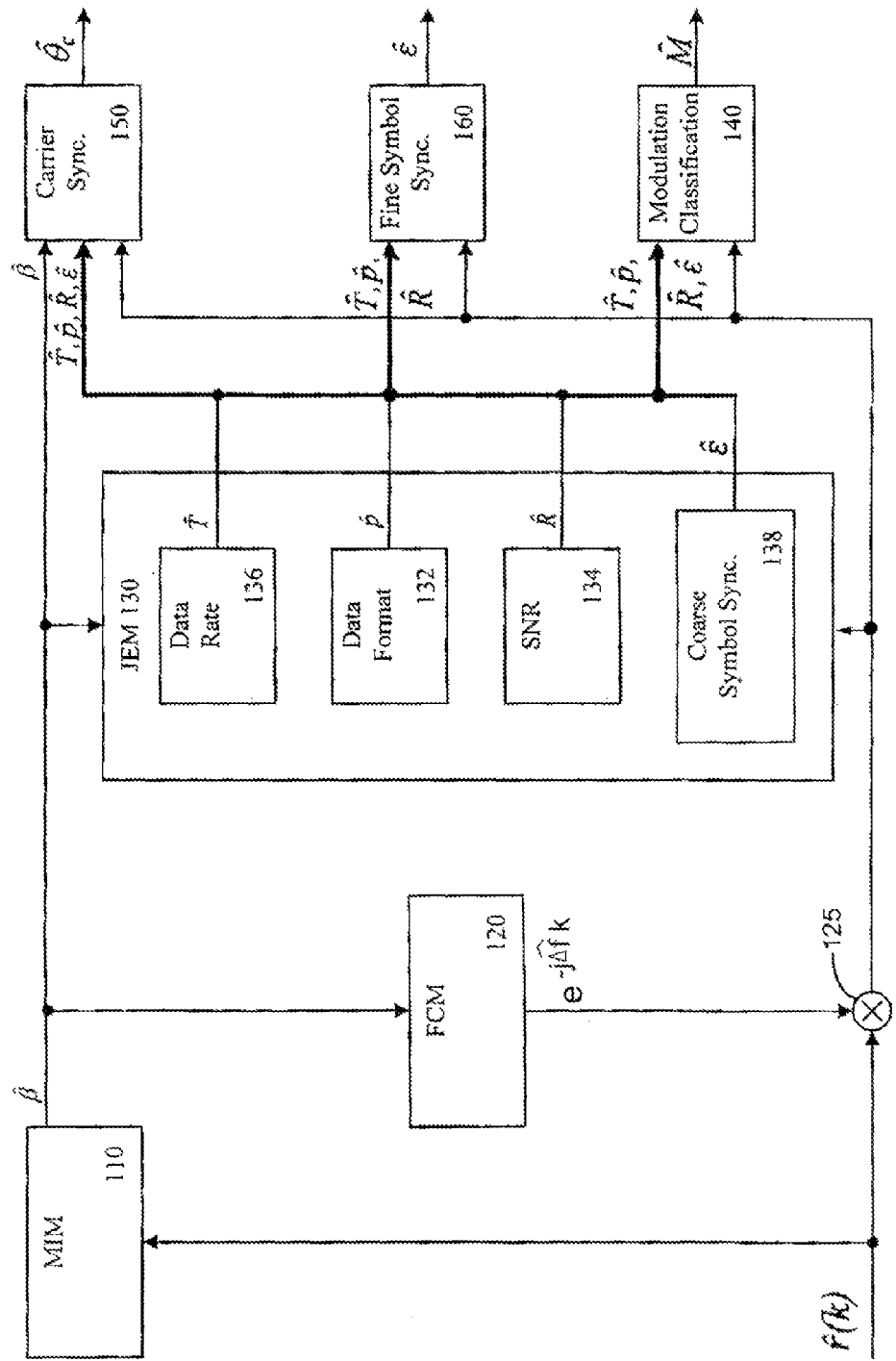
FIG. 1 is a block diagram of a radio receiver 100 operating in a coarse mode for determining the signal type of an incoming signal with unknown defining characteristics in accordance with one exemplary embodiment of the invention.

FIG. 1 is a block diagram of a radio receiver 100 for determining the signal type of an incoming signal with unknown defining characteristics in accordance with one exemplary embodiment of the invention. Radio receiver 100 includes a modulation index module (MIM) 110 that may be any hardware and/or software suitably configured to estimate the modulation index and/or determine the actual modulation index of an incoming signal with unknown characteristics. It is common is to allocate a portion of the total transmitted power $P_t$ to a discrete carrier for purposes of carrier synchronization. For example, in the case of binary phase-shift keying (BPSK) modulation, the simplest way to accomplish this is to employ a phase modulation index other than 90 degrees. When this is done, the fraction of power allocated to the discrete carrier $P_c$ becomes a function of the total transmitted power $P_t$. MIM 110 estimates and/or determines the fraction of total power that is allocated to a non-modulated carrier signal and to a data-modulated signal and outputs an estimated modulation index including such estimate. Total power is the sum of the non-modulated carrier signal power and the data-modulated signal power, in watts.

The radio receiver 100 also includes a frequency correction module (FCM) 120 in communication with MIM 110. FCM 120 may be any hardware and/or software suitably configured to track the offset frequency of the incoming signal with unknown characteristics without knowledge a priori of the signal-to-noise ratio (SNR), data rate, modulation type, etc. Thus, FCM 120 receives the incoming signal and the estimated modulation index from MIM 110, and outputs a signal having an estimated offset frequency based on the incoming signal and the estimated modulation index. FCM 120 is in communication with a multiplier 125 and outputs the signal having an estimated frequency offset to multiplier 125, and multiplier 125 mixes the original signal with the signal having the estimated frequency offset to produce a frequency-corrected received signal.

Radio receiver 100 also includes a joint estimator module (JEM) 130 in communication with MIM 110 and multiplier 125. JEM 130 may be any hardware and/or software suitably configured to receive the estimate of the modulation index and/or the actual modulation index from MIM 110 and to utilize the estimated modulation index and frequency corrected received signal to estimate and/or determine defining characteristic(s) of the incoming signal. In the preferred embodiment JEM 130 utilizes the estimated modulation index to estimate and/or determine the data rate of the incoming signal, the SNR of the incoming signal, the waveform shape and pulse shape of the incoming signal, and/or symbol timing.

As discussed in greater detail below, one or more of the estimates and/or characteristics produced by JEM 130 is transmitted back to MIM 110 to refine the estimate of the modulation index and/or help determine the modulation index. Furthermore, one or more of the estimates and/or characteristics produced by JEM 130 is transmitted to a modulation classifier module (MCM) 140, a carrier synchronization module (CSM) 150, and/or a fine symbol synchronizer (FSS) 160, all in communication with JEM 130 and with each other.

MCM 140 may be any hardware and/or software suitably configured to derive approximations of the maximum likelihood (ML) modulation classification based on one or more estimations and/or characteristics received from multiplier 125 (i.e., MIM 110 and FCM 120 estimates), JEM 130, CSM 150, and/or FSS 160.

CSM 150 may be any hardware and/or software suitably configured to track the carrier phase independent of the modulation of the incoming signal. Furthermore, CSM 150 is such that it includes a structure that performs the carrier synchronization function for all orders of phase-shift-keying (PSK) modulation based on one or more estimations and/or characteristics received from MIM 110, multiplier 125 (i.e., MIM 110 and FCM 120 estimates), JEM 130, MCM 140, and/or FSS 160.

FSS 160 may be any hardware and/or software suitably configured to determine an estimate of the symbol timing of the incoming signal. FSS 160 determines the estimate of the symbol timing of the incoming signal based on one or more estimates and/or characteristics received from signal combiner 125 (i.e., MIM 110 and FCM 120 estimates), JEM 130, and/or CSM 150.

In general operation, radio receiver 100 functions to receive an incoming signal, and through estimations and one or more refining iterations, determines the signal type and decodes the incoming signal utilizing an appropriate decoder. How MIM 110, FCM 120, JEM 130, MCM 140, CSM 150, and FSS 160 calculate the estimations and perform the iterations to determine the signal type is discussed in greater detail below. Notably, the workings of MIM 110, FCM 120, JEM 130, MCM 140, CSM 150, and FSS 160 depend on whether radio receiver 100 is performing coarse estimations, fine estimations, non-coherent estimations, or coherent estimations, and on what information has been estimated and/or determined by prior iterations.

Again, MIM 110 is configured to receive signals with unknown characteristics. Because radio receiver 100 does not know exactly what type of signal it may receive, MIM 110 is configured to receive and estimate the modulation index for an array of signal types.

Figure 27:
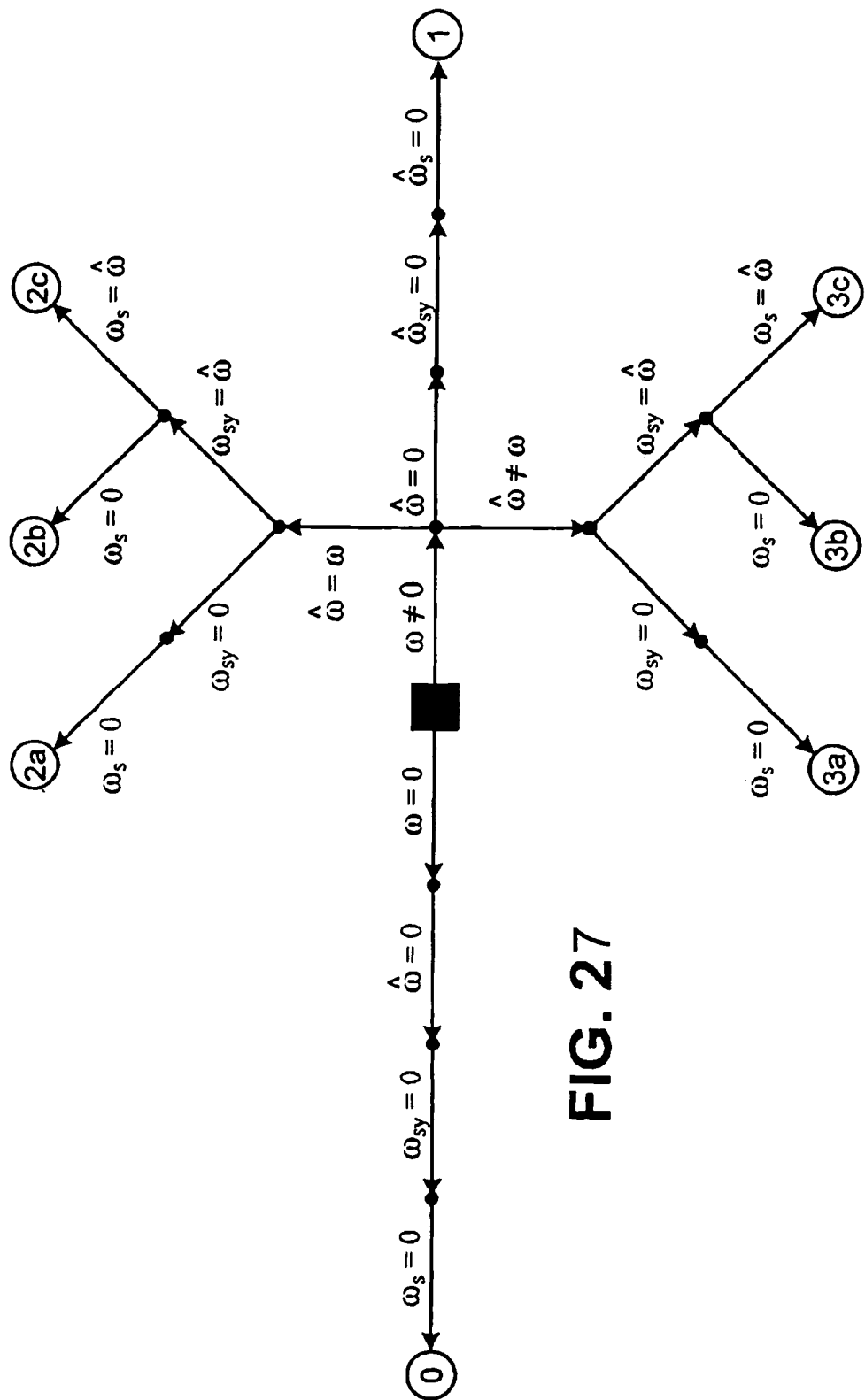
FIG. 27 is a tree diagram for the sampled version of the SSME SNR estimator 1341 for MPSK modulation.

For example, phase-shift keying (PSK) is a method of digital communication in which the phase of a transmitted signal is varied to convey information. There are several methods that can be used to accomplish PSK. The simplest PSK technique is called binary phase-shift keying (BPSK). It uses two opposite signal phases (0 and 180 degrees). In the case of binary phase-shift keying (BPSK) modulation, a phase modulation index $\beta$ other than 90 degrees may be used. When this is done, the fraction of power allocated to the discrete carrier becomes $P_c = P_t \cos^2 \beta$ with the remaining fractional power $P_d = P_t \sin^2 \beta$ available for data detection. When using this signaling mode, the power spectrum of the data modulation should be such that it does not interfere with the extraction of the discrete carrier by an appropriate carrier tracking loop such as a phase-locked loop (PLL). In other words, the discrete carrier should be inserted at a point where the power spectrum of the data modulation is minimum, and preferably equal to zero. In the case of digital data, this rules out direct modulation of the carrier with a Non-Return to Zero (NRZ) data stream whose spectrum is maximum at direct current (DC) which at radio frequencies would correspond to the carrier frequency. Thus, for example, the data may be first modulated onto a sub-carrier whose frequency is selected significantly higher than the data rate so that the sidebands of the data modulation are sufficiently reduced by the time they reach the carrier frequency. More sophisticated forms of PSK exist. In multiple phase-shift keying with or without phase compensation. In the most general scenario, a taxonomy of cases for analysis is illustrated by the tree diagram of FIG. 27 for the sampled version of the SSME 1341. FIG. 27 begins at the square node in the middle and proceeds outward to any of the eight leaf nodes representing combinations of $\omega$, $\hat{\omega}$, $\omega_{sy}$, and $\omega_s$. For SSME 1342, a few of the tree branches of FIG. 27, namely, 2c and 3c, do not apply.

Other signals use a coherent communication mode where carrier synchronization is established directly from the data-bearing signal (e.g., using a conventional Costas loop). In this case, none of the transmitted power is allocated to a discrete carrier and the system is said to operate in a suppressed carrier mode which, in the case of BPSK, corresponds to $\beta=90°$. Although a Costas loop operates with a less efficient performance (e.g., larger mean-square phase tracking error) than a PLL, it offers the advantage of not requiring a discrete carrier to lock onto and thus all of the transmitted power can be used for the purpose of data detection.

Given that the foregoing or other transmission modes may be received by radio receiver 100, it is important that MIM 110 be able to estimate the modulation index or equivalently, the ratio of transmitted carrier to data power of the various received signals. In one exemplary embodiment, MIM 110 utilizes an ML estimation approach to estimate the modulation index along with appropriate approximation of the non-linearities that result, to allow for practical implementations at coarse and fine modes.

With reference again to FIG. 1, radio receiver 100 is shown operating in a coarse mode according to one exemplary embodiment of the invention. When radio receiver 100 receives an incoming signal (which is represented as r(t)), the signal is transmitted to MIM 110 and signal combiner 125. MIM 100 estimates an initial modulation index without a priori knowledge of the modulation, data rate, and/or symbol timing of the incoming signal. The incoming signal with the initial estimate of the modulation index is then transmitted to other modules of radio receiver 100 to estimate other defining characteristics.

If the signal with the initially estimated modulation index includes a residual carrier, the signal is transmitted to FCM 120 for frequency acquisition and tracking. If the signal with the initial estimated modulation index does not include a residual carrier, the signal is also transmitted to FCM 120 for frequency acquisition and tracking. Furthermore, the signal with the initially estimated modulation index and corrected frequency is also transmitted to JEM 130, 140, CSM 150 AND/OR 160.

The signal with the initially estimated modulation index is transmitted to JEM 130 so that the received signal can be used to estimate an initial data format (via data format module 132), an initial SNR (via SNR module 134), an initial data rate (via data rate module 136), and/or an initial estimate of the symbol timing (via CSS 138). Furthermore, the signal with the initial estimated modulation index is transmitted to CSM 150 so that the received signal can be used to initially track the carrier phase of the incoming signal. Moreover, CSM 150 also receives and uses the initial estimates of the data format (from data format module 132), the SNR (from SNR module 134), the data rate (from data rate module 136), and/or the estimate of the symbol timing (from CSS 138); and/or receives the original signal combined with the output of FCM 120 from multiplier 125 in initially tracking the carrier phase of the incoming signal.

FSS 160 receives and uses the initial estimates of the data format (from data format module 132), the SNR (from SNR module 134), and/or the data rate (from data rate module 136); and/or receives the original signal combined with the output of FCM 120 from multiplier 125 to initially estimate the symbol timing of the incoming signal. Likewise, MCM 140 receives and uses the initial estimates of the data format (from data format module 132), the SNR (from SNR module 134), the data rate (from data rate module 136), and/or the estimate of the symbol timing (from CSS 138); and/or receives the original signal combined with the output of FCM 120 multiplier 125 to initially estimate the modulation classification of the incoming signal. In one exemplary embodiment, the initial estimate of the carrier phase tracking, the initial estimate of the symbol timing, the initial estimate of the modulation classification, the initial estimate of the data format, and/or the initial estimate of the data rate are used to refine and/or determine the type of the incoming signal in a fine mode of operation of radio receiver 100.

Figure 2:
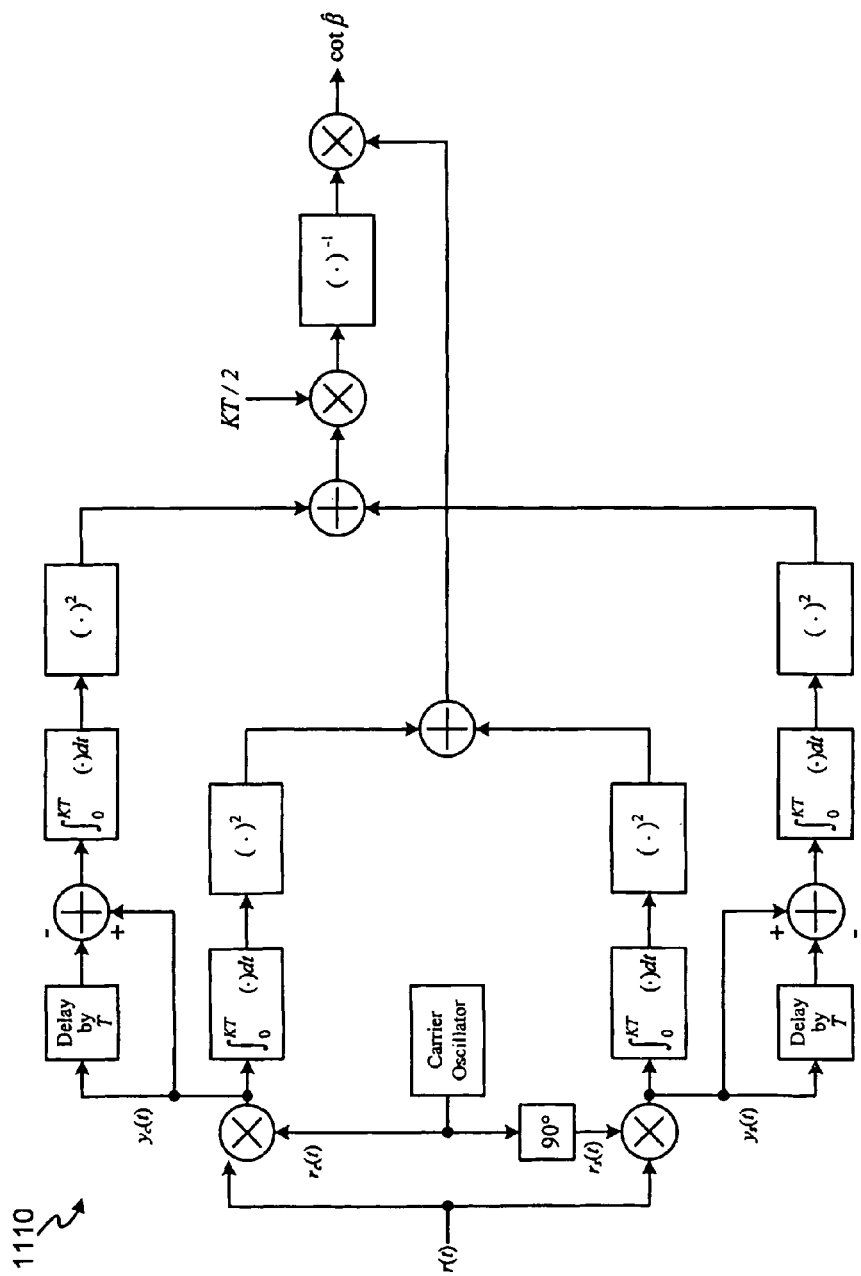
FIG. 2 is a block diagram of radio receiver 100 operating in a fine mode in accordance with one exemplary embodiment of the invention.

FIG. 2 is a block diagram of radio receiver 100 operating in a fine mode in accordance with one exemplary embodiment of the invention. When operating in fine mode, MIM 110 receives the initial estimate of the carrier phase tracking (from CSM 150), the initial estimate of the symbol timing (from FSS 160), the initial estimate of the modulation classification (from MCM 140), the initial estimate of the data format (from data format module 132), and/or the initial estimate of the data rate (from data rate module 136) to determine a better estimate of the modulation index. This better estimate of the modulation index is then utilized similar to the initial estimate of the modulation index discussed above with respect to FIG. 1. Thus, at the end of operating in fine mode, radio receiver 100 will produce a better estimate of the carrier phase tracking, the symbol timing, the modulation classification, the data format, and/or the data rate, in which one or more may be used in one or more subsequent iterations to produce even finer estimations.

Figure 3:
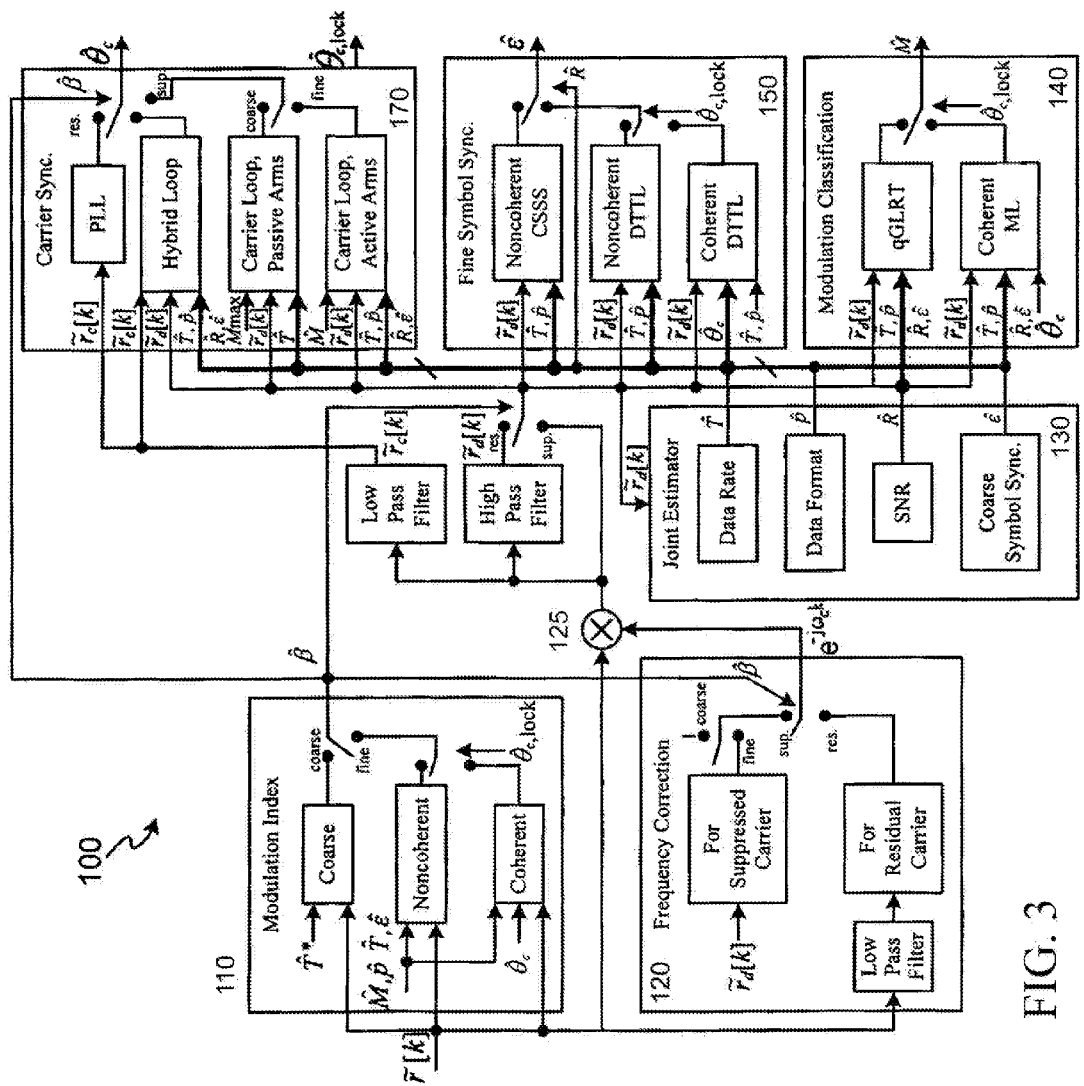
FIG. 3 is a block diagram of the detailed operations of radio receiver 100.

For reference purposes, FIG. 3 is a block diagram of the detailed operations of radio receiver 100. The MIM 110 estimates and/or determines the action of total power that is allocated to a non-modulated carrier signal and to a data-modulated signal and outputs an estimated modulation index including such estimate. FCM 120 receives the incoming signal and the estimated modulation index from MIM 110, and outputs a signal having an estimated corrected frequency based on the incoming signal and the estimated modulation index. FCM 120 outputs the signal having an estimated corrected frequency to multiplier 125 which mixes the original signal with the signal having the estimated frequency correction to produce a frequency corrected received signal. JEM 130 receives the modulation index estimate and frequency corrected received signal to estimate various defining characteristic(s) of the incoming signal, including data rate of the incoming signal, SNR of the incoming signal, waveform shape and pulse shape of the incoming signal, and/or symbol timing. One or more of the estimates and/or characteristics produced by JEM 130 is transmitted to MCM 140, CSM 150, and FSS 160 (CSM 150 to track the carrier phase, FSS 160 to estimate of the symbol timing of the incoming signal, and MCM 140 for maximum likelihood (ML) modulation classification or the modulation classifier. Radio receiver 100 functions to receive an incoming signal, and through estimations and one or more refining iterations, determines the signal type and decoding the incoming signal utilizing an appropriate decoder.

Figure 4:
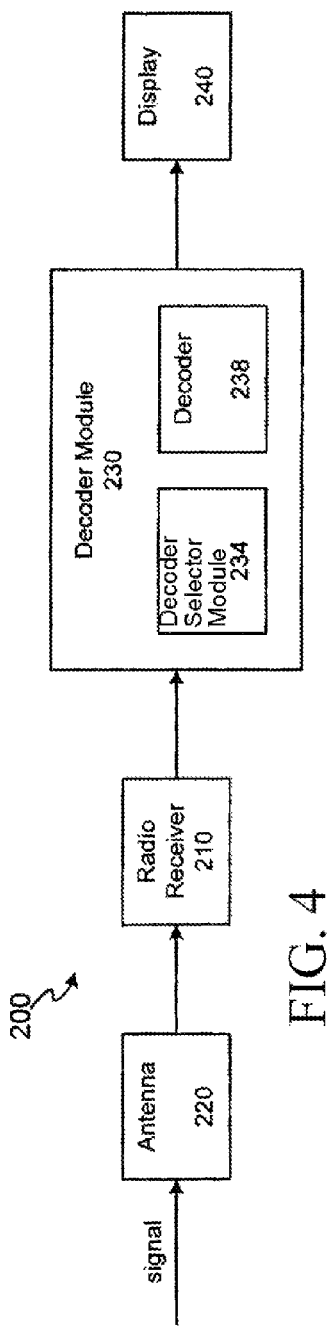
FIG. 4 is a block diagram of a system 200 for receiving and decoding a signal without a priori knowledge of the defining characteristics of an incoming signal.

FIG. 4 is a block diagram of a system 200 for receiving and decoding a signal without a priori knowledge of the defining characteristics of an incoming signal. In one exemplary embodiment, system 200 includes a radio receiver 210 similar to embodiments of radio receiver 100 discussed above connected to and/or in communication with an antenna 220, wherein antenna 220 may be any hardware and/or software suitably configured to receive communication signals.

In addition, system 200 includes a decoder module 230 connected to and/or in communication with radio receiver 210. In one exemplary embodiment, decoder module 230 includes a module 234 including hardware and/or software suitably configured to receive an output signal (including fine estimations of the carrier, phase tracking, the symbol timing, the modulation classification, the data format, and/or the data rate of an incoming signal) from radio receiver 210 and determine the type of signal based on a comparison of the estimates with the characteristics of an array of known signal types. Furthermore, decoder module 230 includes a plurality of decoders 238 to decode the incoming signals based upon the determination made by module 234, wherein each decoder of the plurality of decoders 238 may include any hardware and/or or software suitably configured to decode a particular signal type. As such, each decoder may be any decoder known in the art or developed in the future.

System 200, in various exemplary embodiments, includes a display 240 to display the data decoded by decoder module 230, wherein display 240 may be any hardware and/or software suitably configured to display the data in the incoming signal such that the data can be detected by at least one the five senses of a user and/or an electronic device (e.g., a computing device). For example, display 240 may be an audio and/or visual device such as a television, a monitor, a speaker, a radio, a computer, and the like.

The following are examples of the estimation algorithms incorporated in the above-referenced modules.

Example 1

MIM 110 Coherent Estimation of Modulation Index
For Binary Phase-Shift Keying (PSK) Signals A received BPSK signal r(t) may be represented by the following equation (1):

$$r(t) = \sqrt{2P_t} \sin\left(\omega_c t + \beta \sum_{n=-\infty}^{\infty} c_n p(t-nT)\right) + n(t)$$

$$= \sqrt{2P_t} \cos\beta \sin\omega_c t + \sqrt{2P_t} \sin\beta \sum_{n=-\infty}^{\infty} c_n p(t-nT)\cos\omega_c t + n(t)$$

$$= \sqrt{2P_c} \sin\omega_c t + \sqrt{2P_d} \sum_{n=-\infty}^{\infty} c_n p(t-nT)\cos\omega_c t + n(t) \quad (1)$$

where p(t) is a pulse shape taking on values ±1 and satisfying $T^{-1}\int_0^T p^2(t)dt=1$, T is the symbol rate, $\{c_n\}$ is a binary sequence which is treated as independent, identically distributed (IID) data taking on values ±1 with equal probability, β is the modulation index, $\omega_c$ is the carrier frequency in rad/s, and n(t) is a bandpass additive white Gaussian noise (AWGN) source with single-sided power spectral density $N_0$ W/Hz.

Based on the above AWGN model, then for an observation of K data intervals, the maximum likelihood (ML) modulation index estimation may be derived. Suitable approximations to the nonlinearity can be made, corresponding to low and high data detection SNR conditions. For high data detection SNR, the ML modulation index estimation after approximation is given by $$\cot \hat{\beta} = \frac{\int_0^{KT} r(t)\sin\omega_c t\, dt}{\sum_{k=0}^{K-1} \int_{kT}^{(k+1)T} |r(t)p(t-kT)\cos\omega_c t\, dt|} \quad (2)$$

For low data detection SNR, the ML modulation index estimation after approximation is given by $$\cot \hat{\beta} = \frac{N_0 \int_0^{kT} r(t)\sin\omega_c t\, dt}{2\sqrt{2P_t} \sum_{k=0}^{K-1} \int_{kT}^{(k+1)T} |r(t)p(t-kT)\cos\omega_c t\, dt|} \quad (3)$$

Note that in this case a solution to this equation may not always exist.

For M-PSK modulation (M>2), the received signal r(t) can be represented in passband by:

$$r(t) = \sqrt{2P_c}\sin\omega_c t + \sqrt{2P_d}\cos\left(\omega_c t + \sum_{n=-\infty}^{\infty} \theta_n p(t-nT)\right) + n(t) \quad (5)$$

where $\theta_n = [2q_n + (1+(-1)^{M/2})/2]\,\pi/M$ is the data modulation for the nth MPSK symbol, with independent and uniformly distributed $q_n$. $\{0, 1, \ldots, M-1\}$. Differentiating the conditional likelihood of r(t) given $\theta_n$ and $\beta$ with respect to $\beta$ and equating the result to zero results in the transcendental equation:

$$\int_0^{KT} r(t)\sin\omega_c t\, dt = (\cot\hat{\beta}) \sum_{k=0}^{K-1} \frac{\sum_{q=0}^{(M/2)-1} x_k(q)\sinh\left(\frac{2\sqrt{2P_t}\sin\hat{\beta}}{N_0} x_k(q)\right)}{\sum_{q=0}^{(M/2)-1} \cosh\left(\frac{2\sqrt{2P_t}\sin\hat{\beta}}{N_0} x_k(q)\right)} \quad (6)$$

$$x_k(q) \equiv \int_{kT}^{(k+1)T} r(t)\cos\left(\omega_c t + \frac{(2q+1)\pi}{M}p(t-kT)\right) dt$$

which solution is the ML estimate of the modulation.

Making large SNR approximations, a simplified solution for the ML estimate of modulation index for M-PSK is:

$$\cot \hat{\beta} = \frac{\int_0^{KT} r(t)\sin\omega_c t\, dt}{\sum_{k=0}^{K-1} |x_{k(q)}|_{max}} \quad (7)$$

For low SNR, small argument approximations are supplied:

$$\sin h(x) \approx x, \cos h(x) \approx 1 \quad (8)$$

Applying the approximations in (8) to (6) results in the ML estimate:

$$\cos \hat{\beta} = \frac{N_0 \int_0^{KT} r(t)\sin\omega_c t\, dt}{2\sqrt{2P_t} \sum_{k=0}^{K-1} \frac{2}{M}\sum_{q=0}^{M/2-1} x_k^2(q)} \quad (9)$$

Example 2

MIM Non-Coherent Estimation of Modulation Index For PSK Signals

In another embodiment, MIM 110 performs modulation index estimation for the case where carrier synchronization has not yet been established (i.e., where the carrier phase is random). In the non-coherent case, the modulation index estimate is formed in the absence of carrier synchronization. For BPSK modulation, the received signal is again modeled as in equation (1) with the addition of an unknown (but assumed to be uniformly distributed) carrier phase to both the discrete and data-modulated carriers. This allows a non-coherent estimator of modulation index:

$$\cos \hat{\beta} = \frac{2\left[\left(\int_0^{KT} y_c(t)\, dt\right)^2 + \left(\int_0^{KT} y_s(t)\, dt\right)^2\right]}{\sqrt{KT\left[\left(\int_0^{KT}(y_c(t) - y_c(t-T))^2\, dt\right)^2 + \left(\int_0^{KT}(y_s(t) - y_s(t-T))\, dt\right)^2\right]}} \quad (10)$$

In the absence of noise this estimator produces the true value of modulation index.

In yet another embodiment, MIM 110 performs modulation index estimation for the case when the modulation type symbol timing and data rate are also unknown. The modulation index estimators discussed above do not require an SNR estimate, or both an SNR estimate and a carrier phase estimate. However, they both utilize knowledge of the PSK modulation size, data rate, and symbol timing, as seen by the use (either explicitly or implicitly) of the parameters M and T and precise integration limits in equations (9) and (10).

The same architecture shown in FIG. 2 above can be used for a general M-PSK modulation where modulation type M is unknown, and where the data rate (1/T) and fractional symbol timing ($\epsilon$) are also unknown.

FCM 120, in one embodiment, includes an open frequency estimator when a residual carrier is available. In another embodiment, FCM 120 includes a closed-loop frequency estimator when a residual carrier is available. Notably, the invention contemplates use of both an additive white Gaussian noise (AWGN) channel and a Rayleigh fading channel.

An open loop estimation of a frequency offset is obtained as:

$$\Delta \hat{f} = \operatorname*{argmax}_{\Delta f} \lambda(\Delta f) \quad (11.1)$$

where Δf is the offset frequency and $$\lambda(\Delta f) = \left| \sum_{k=0}^{N-1} \tilde{r}_c[k] e^{-j2\pi f k T_s} \right| \quad (11.1)$$

is the ML metric for estimating the frequency offset, and $\tilde{r}_c[k]$ is the sequence of observed baseband samples.

However, this operation is equivalent to obtaining the fast Fourier transform (FFT) of the received sequence, taking its magnitude, and then finding the maximum value.

Figure 5:
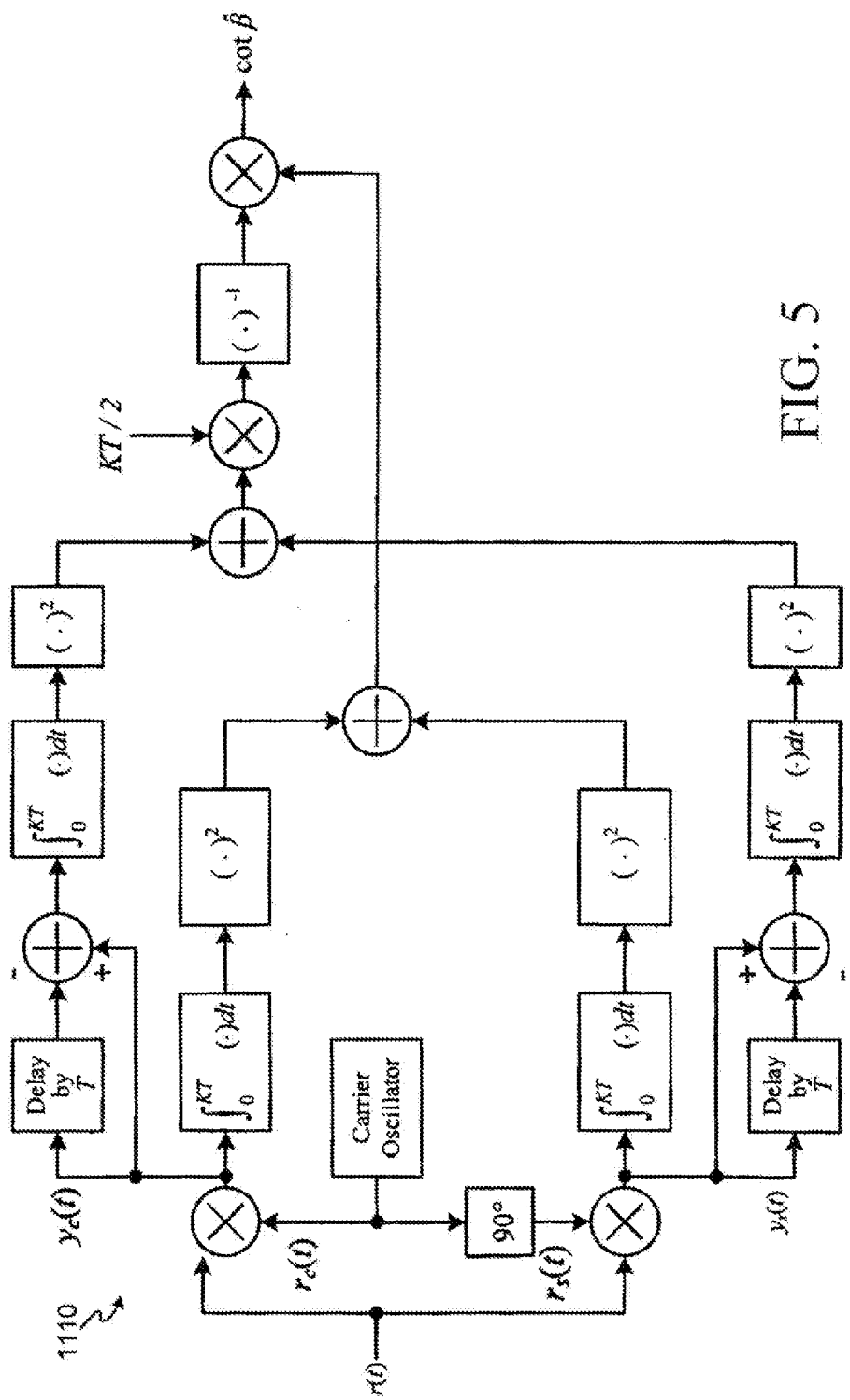
FIG. 5 is a block diagram of an exemplary embodiment of modulation index estimator 1110.

FIG. 5 is a block diagram of an exemplary embodiment of open loop frequency estimator 1110. The error signal for a closed-loop estimator can be obtained as:

$$e = \frac{\partial}{\partial \Delta f} \lambda(\Delta f) \quad (11.2)$$

The derivative of $\lambda(\Delta f)$ for a small $\epsilon$ can be approximated as:

$$e = |Y(\Delta f + \epsilon)| - |Y(\Delta f - \epsilon)| \quad (11.3)$$

where $$Y(\Delta f + \epsilon) = \sum_{k=0}^{N-1} \tilde{r}_c[k] e^{-j2\pi \Delta f k T_s} e^{-j2\pi \epsilon k T_s} \quad (11.4)$$

An error signal detector for a closed-loop frequency correction can be implemented based on the above equations.

Figure 6:
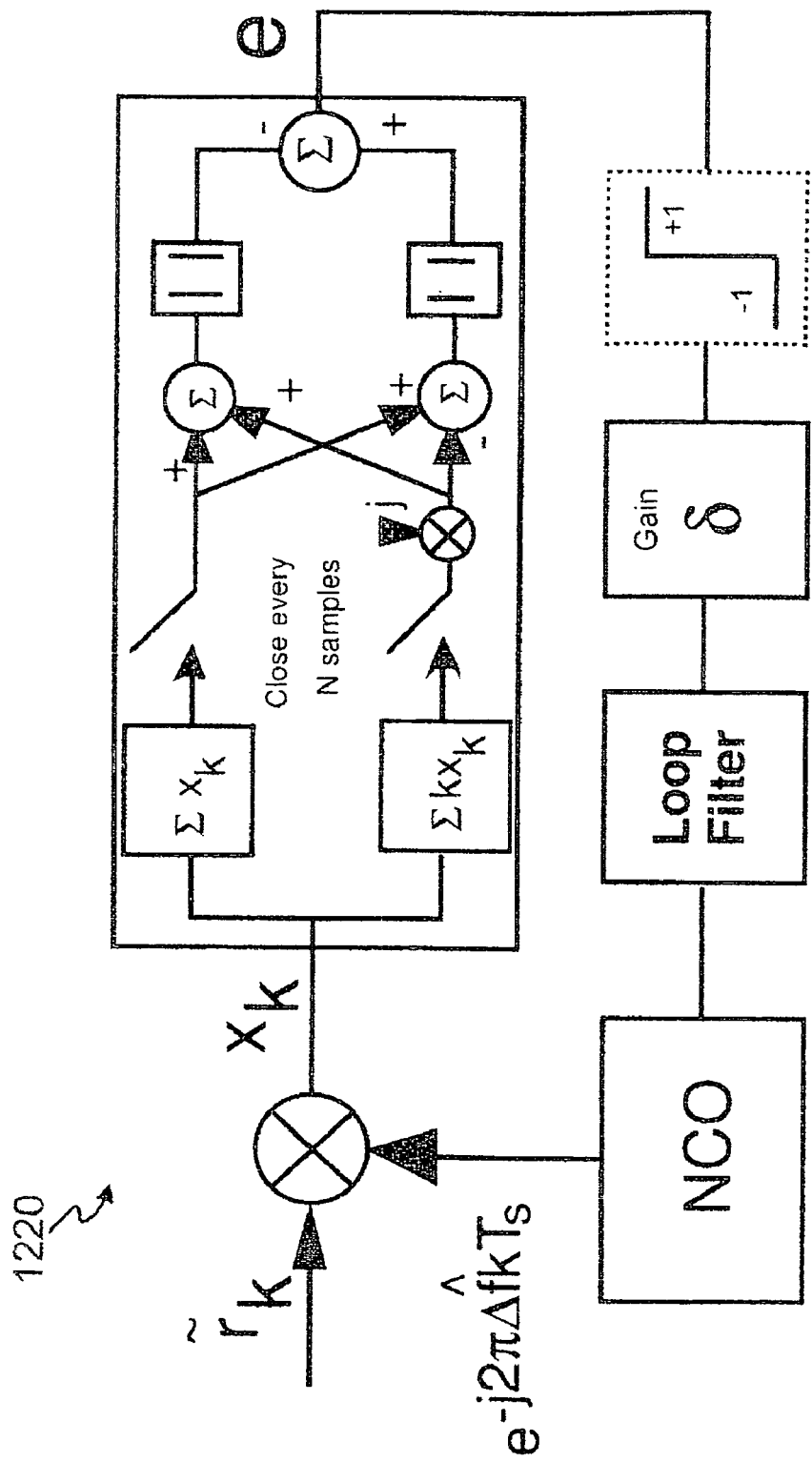
FIG. 6 is a block diagram of one exemplary embodiment of closed-loop frequency estimator 1220.

FIG. 6 is a block diagram of one exemplary embodiment of closed-loop frequency estimator 1220 in accordance with one exemplary embodiment of the invention. Notably, the dashed box in FIG. 6 and all other figures represent the fact that the hard limiter is optional. This means that closed-loop estimator 1220 may be implemented either with or without such a hard limiter.

Figure 7:
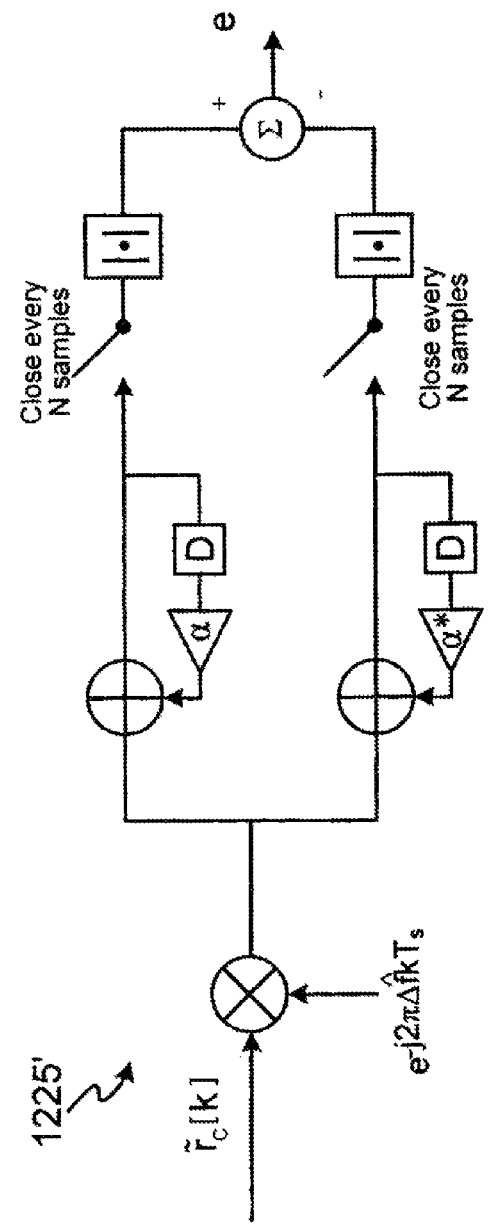
FIG. 7 is a block diagram illustrating one exemplary embodiment of a frequency correction error signal detector 1225' for a residual carrier signal.

FIG. 7 is a block diagram illustrating one exemplary embodiment of an error signal detector 1225 for a residual carrier based on the above equations, wherein $$\alpha = e^{-j2\pi \epsilon T_s}.$$

Figure 8:
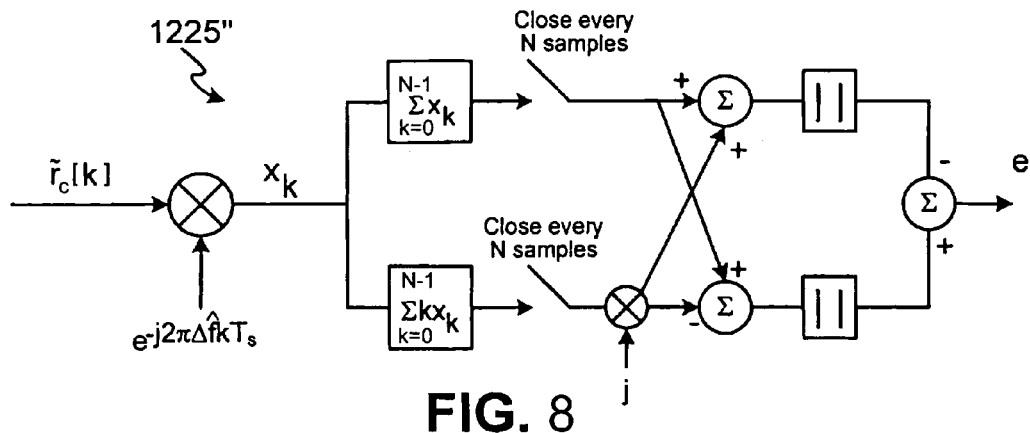
FIG. 8 is a block diagram of an exemplary embodiment of a frequency correction error signal detector 1225" for a residual carrier signal.

FIG. 8 is a block diagram of an exemplary embodiment of an error signal detector 1225" in accordance with one exemplary embodiment of the invention. Implementation of error signal detector 1225" is complex. Instead of approximating the error signal as in (70), we note that:

$$e = \text{Im}(Y^* U) = \sum_{i=0}^{N-1} \text{Im}(X_{0,i}^* X_{i+1,(N-1)}) \approx C_5 \text{Im}(X_{0,N/2-1}^* X_{N/2,N-1}) \quad (12)$$

where $$X_{m,n} = \sum_{k=m}^{n} \tilde{r}_c[k] e^{-j2\pi \Delta f k T_s} \quad (13)$$

Figure 9:
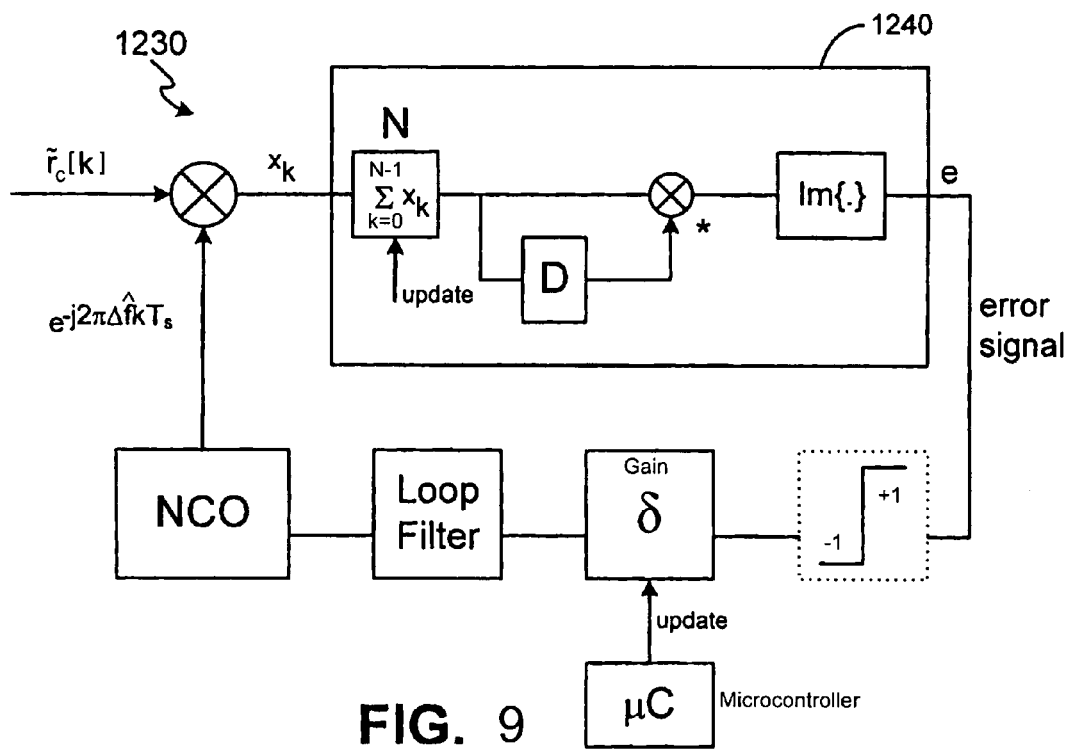
FIG. 9 is a block diagram of a closed-loop frequency estimator 1230 for a residual carrier signal, with the approximate error signal detector.

One embodiment of a closed-loop frequency estimator 1230 for a residual carrier signal with the approximate error signal detector given by (12) is illustrated in the block diagram of FIG. 9. The parameters N (the number of samples to be summed) and δ (gain) should be optimized and updated after the initial start to perform both the acquisition and tracking of the offset frequency.

The gain δ that was shown in the closed-loop frequency tracking system is usually part of a digital loop filter 1250. The digital loop filter without gain δ can be represented as:

$$F(z) = 1 + \frac{b}{1 - z^{-1}} \quad (14)$$

Figure 10:
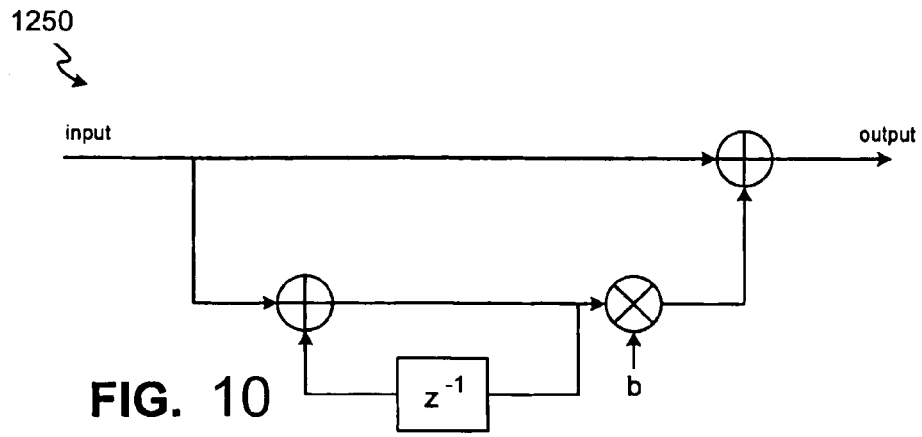
FIG. 10 is a block diagram of a circuit for a digital loop filter 1250 for frequency tracking loops.

One embodiment of a circuit for a digital loop filter 1250 is shown in the block diagram of FIG. 10. In addition to the gain δ, the parameter b should also be optimized for achieving the best performance.

Consider a data modulated signal with a suppressed carrier, wherein let $\tilde{r}(t)$ be the received complex waveform, and $a_i$ the complex data representing an M-PSK or a QAM modulation. Let p(t) be the transmit pulse shaping. Then the received signal can be modeled as:

$$\tilde{r}(t) = \sum_{i=-\infty}^{\infty} a_i p(t - iT) e^{j(2\pi \Delta f t + \theta_c)} + \tilde{n}(t) \quad (15)$$

where T is the data symbol duration, and $\tilde{n}(t)$ is the additive white Gaussian noise (AWGN) with single-sided power spectral density $2N_0$W/Hz per dimension.

Figure 11:
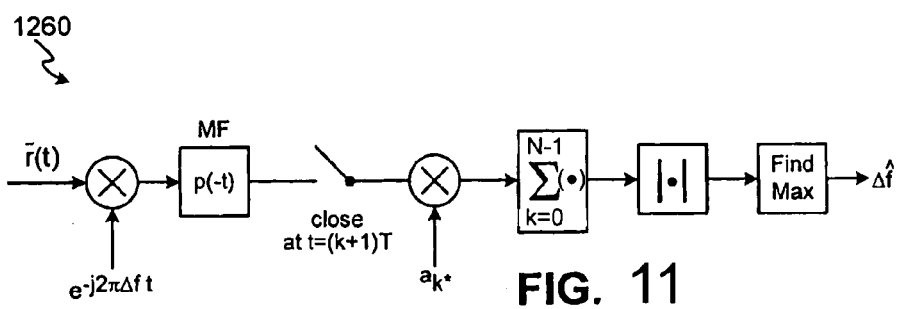
FIG. 11 is a block diagram of an open-loop frequency estimator 1260 for a suppressed carrier signal with known data.

The open loop estimation:

$$\Delta \hat{f} = \underset{\Delta f}{\text{argmax}} \, \lambda(\Delta f) \quad (16)$$

is equivalent to multiplying the received signal by $e^{-j(2\pi \Delta f t)}$, passing it through the matched filter with impulse response p(−t), and sampling the result at t=(k+1)T, which produces the sequence of $z_k$s. Next, sum the $z_k$s, take its magnitude, and then find the maximum value by varying the frequency Δf between $-\Delta f_{max}$ and $\Delta f_{max}$ where $\Delta f_{max}$ is the maximum expected frequency offset. In one exemplary embodiment, FCM 120 utilizes an open-loop frequency estimator 1260 (see the block diagram of FIG. 11) for a suppressed carrier with known data to perform the operations of (16).

The error signal, for closed-loop tracking can be obtained as:

$$e = \frac{\partial}{\partial \Delta f} \lambda(\Delta f) \quad (17)$$

Figure 12:
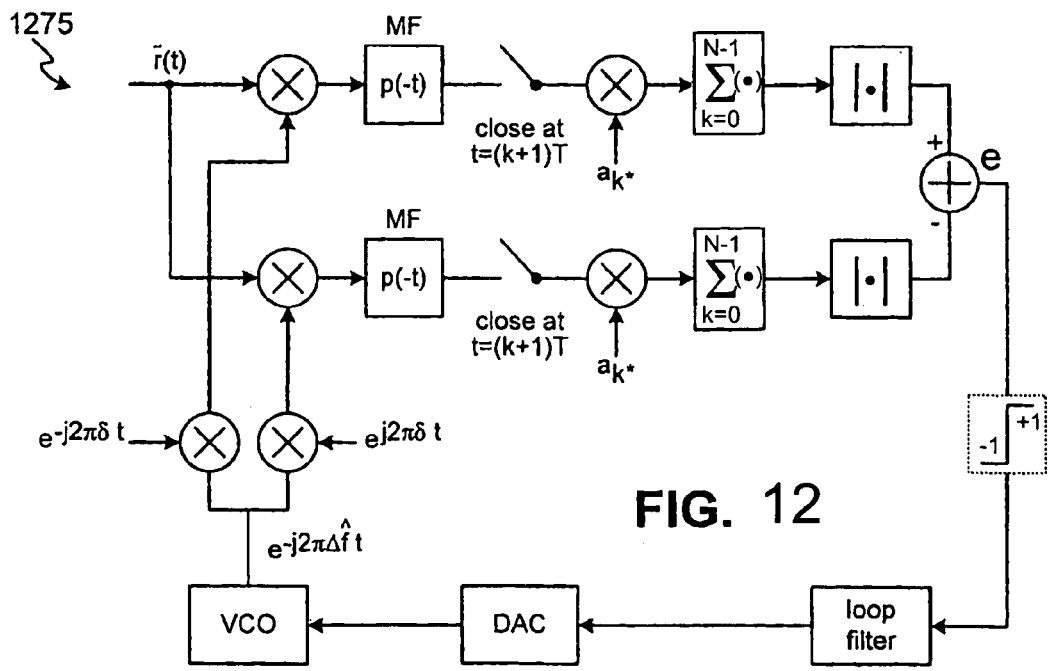
FIG. 12 is a block diagram of an error signal detector 1275 for the closed-loop frequency correction for a suppressed carrier signal with known data.

An error signal detector 1275 for the closed-loop frequency correction using the above equations, in an exemplary embodiment, is shown in FIG. 12. Notably, in FIG. 12, DAC denotes a Digital-to-Analog Converter.

The error signal can be calculated by taking the derivative of $\lambda^2(\Delta f) = |Y|^2$ to obtain:

$$e = \text{Im}(Y^* U) \quad (18)$$

The error signal in (18) can also be written as:

$$e = |Y - jU| - |Y + jU| \quad (19)$$

Figure 13:
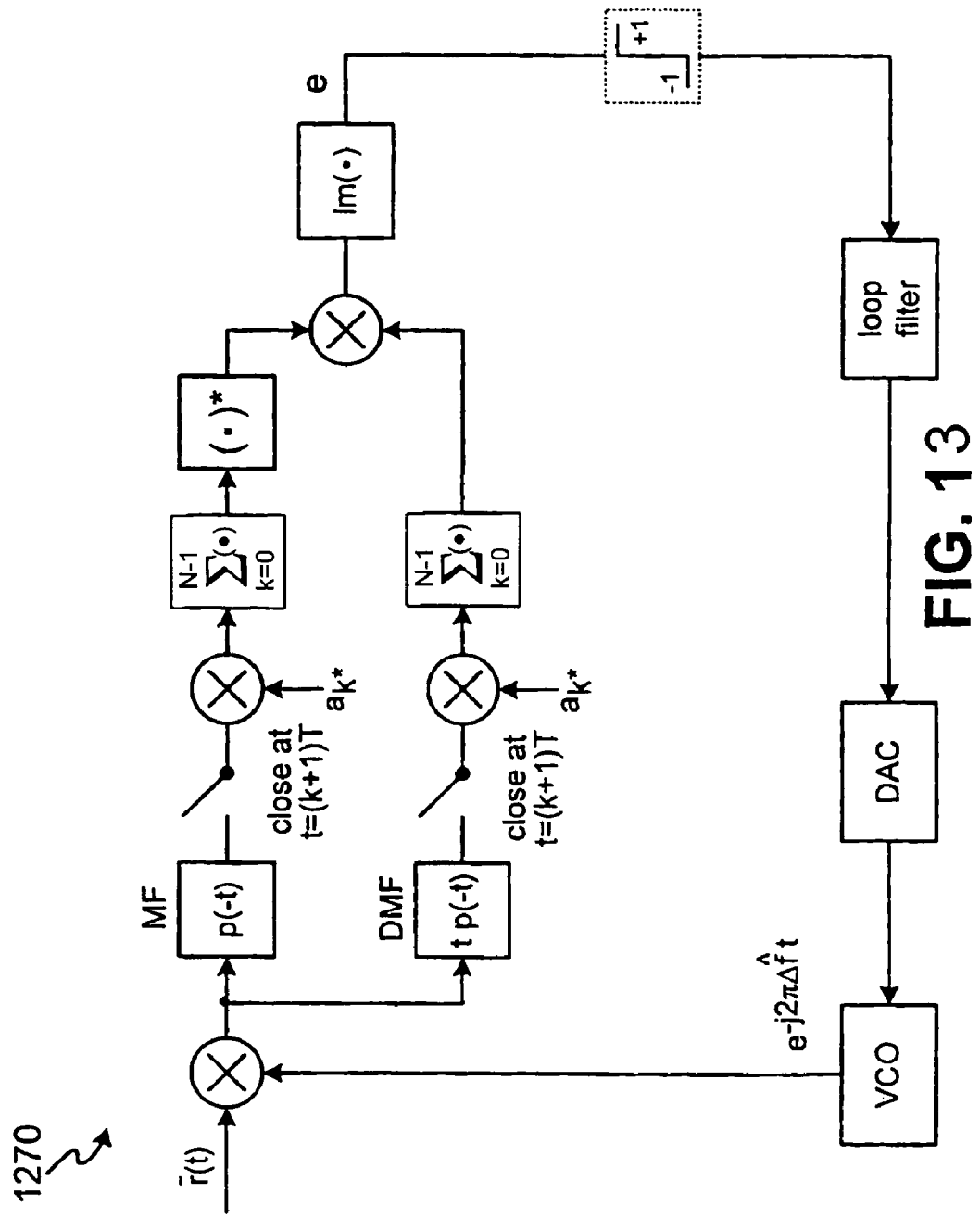
FIG. 13 is a block diagram of one embodiment of a closed-loop frequency estimator 1270 for a suppressed carrier signal with known data.
Figure 14:
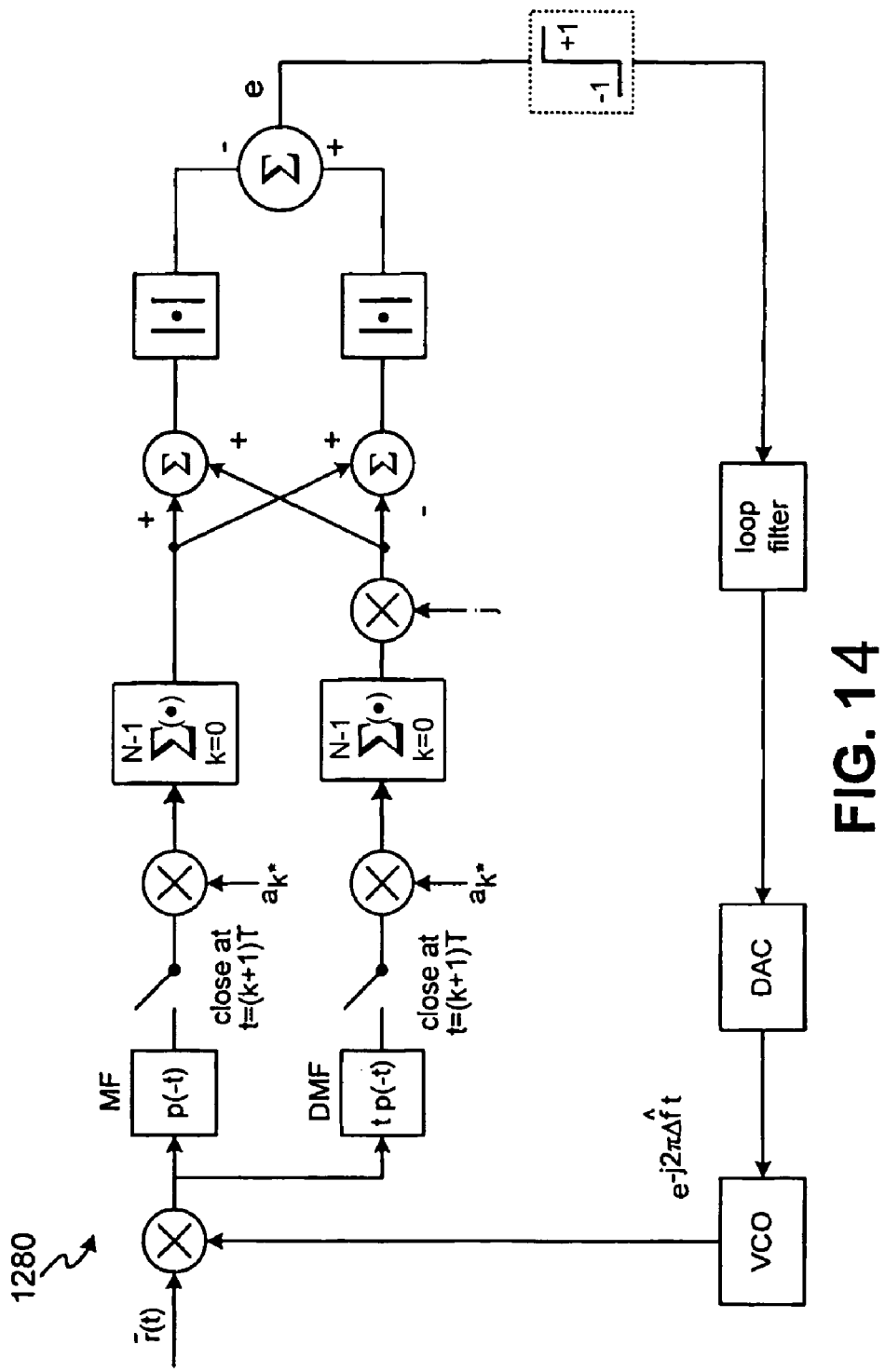
FIG. 14 is a block diagram of a closed-loop frequency estimator 1280 for a suppressed carrier signal with known data.

FIG. 13 is a block diagram of one embodiment of a closed-loop frequency estimator 1270 using the error signal detector given by (18). Similarly, a block diagram of a closed-loop frequency estimator 1280 using the error signal detector given by (19), in one embodiment, is shown in FIG. 14.

Figure 15:
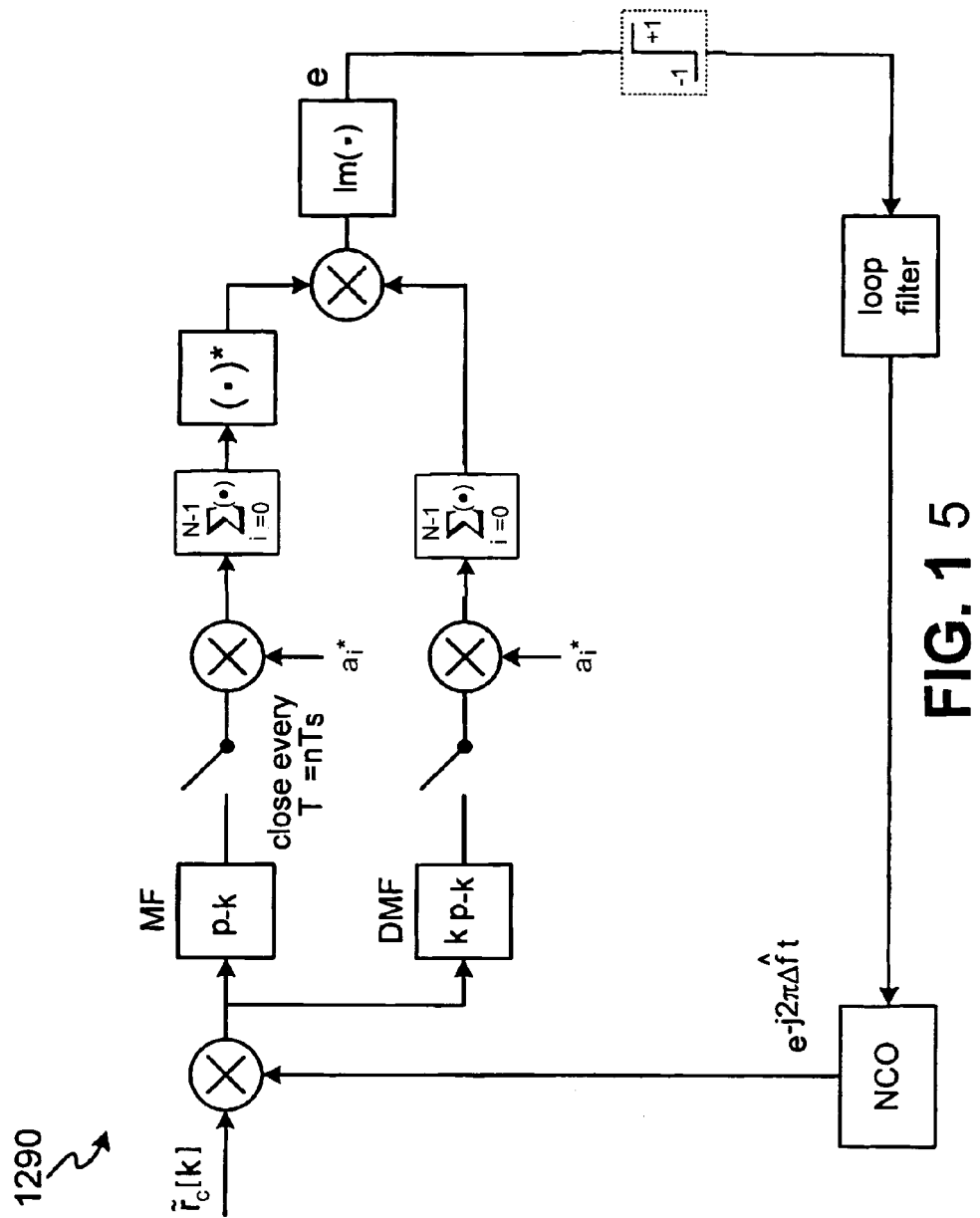
FIG. 15 is an all-digital version of a closed-loop frequency estimator 1290 for a suppressed carrier signal with known data.

Closed-loop frequency estimators 1270 and 1280 each include mixed analog and digital circuits. An all-digital version of a closed-loop frequency estimator 1290 in accordance with another exemplary embodiment of the invention is illustrated FIG. 15, wherein closed-loop frequency estimator 1290 operates on the received samples $\tilde{r}_k$. In FIG. 15, $p_k$ represents the discrete time version of the pulse shaping p(t), where there are n samples per data symbol duration T. Notably, an all digital version of other closed-loop estimators can be obtained in a similar manner and are each contemplated by the invention.

FCM 120 includes a non-data-aided frequency estimator 1292 for situations where the data is unknown to radio receiver 100. The $I_0(x)$ function can be approximated as:

$$I_0\left(\frac{2}{N_0}|Y|\right) \approx 1 + \frac{1}{N_0^2}|Y|^2$$

For open loop estimation, the equation:

$$\Delta \hat{f} = \underset{\Delta f}{\mathrm{argmax}}\, \lambda(\Delta f) \quad (20)$$

is equivalent to multiplying the received signal by $e^{-j(2\pi\Delta ft)}$, passing it through a matched filter with impulse response $p(-t)$, and sampling the result at $t=(k+1)T$, which produces the sequence of $z_k$s. Next, take the magnitude square of each $z_k$, perform summation, and then find the maximum value by varying the frequency $\Delta f$ between $-\Delta f_{max}$ and $\Delta f_{max}$ where $$\mu_{\hat{R}_i} \equiv \mu_{\hat{R};n_i} f_{max}$$

is the maximum expected frequency offset.

Figure 16:
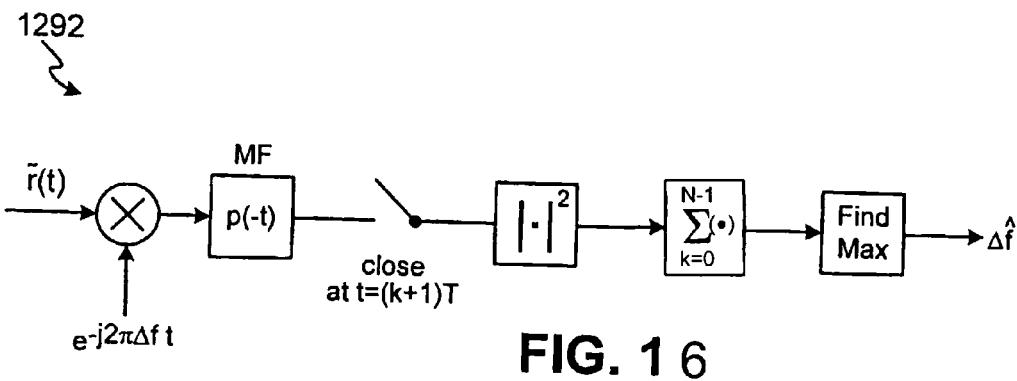
FIG. 16 is a block diagram of an open-loop frequency estimator 1292 for a suppressed carrier signal with unknown data.

FIG. 16 is a block diagram of a circuit 1292 to perform the operations of (20).

The error signal for closed-loop tracking can be approximated as:

$$e = \sum_{k=0}^{N-1} \{|z_k(\Delta f + \delta)|^2 - |z_k(\Delta f - \delta)|^2\} \quad (21A)$$

Figure 17:
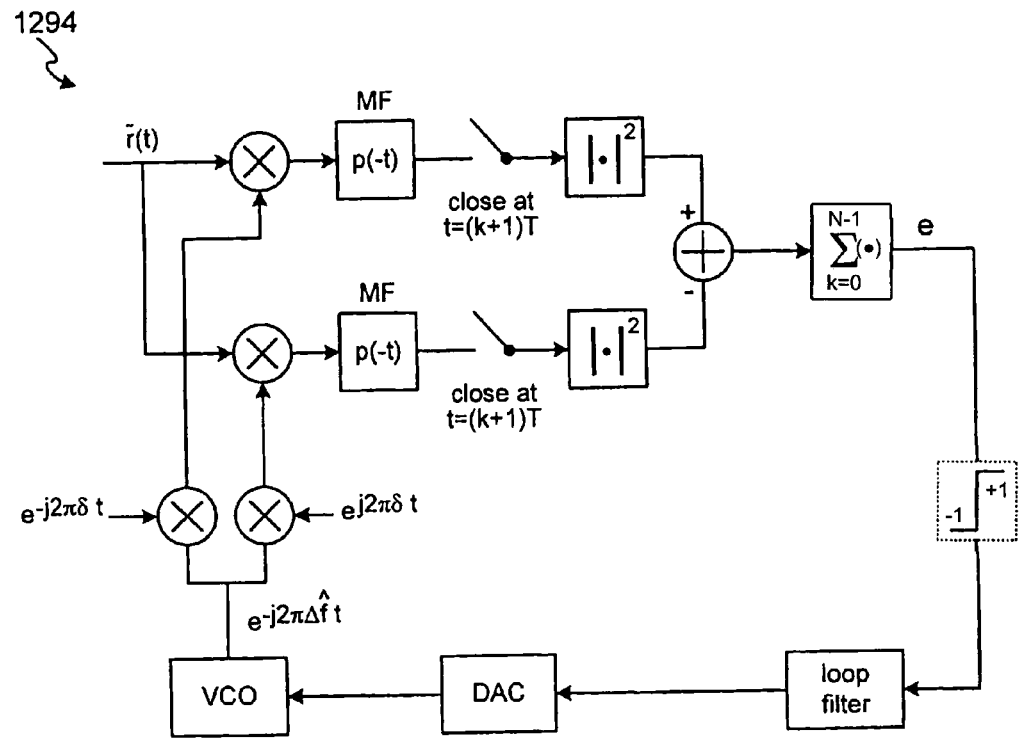
FIG. 17 is a block diagram of a frequency correction error signal detector 1294 for a suppressed carrier signal with unknown data.

One exemplary embodiment of an error signal detector 1294 for closed-loop frequency correction using the above equations is illustrated in the block diagram of FIG. 17.

The error signal is obtained as:

$$e = \sum_{k=0}^{N-1} \mathrm{Im}\{z_k^*(\Delta f) u_k(\Delta f)\} \quad (21B)$$

and $$u_i(\Delta f) = \int_{iT}^{(i+1)T} \tilde{r}(t) t p(t - iT) e^{-j(2\pi\Delta ft)}\, dt \quad (22)$$

Note that the error signal in (103) can also be written as:

$$e = \sum_{k=0}^{N-1} \{|z_k(\Delta f) - j u_k(\Delta f)|^2 - |z_k(\Delta f) + j u_k(\Delta f)|^2\} \quad (23)$$

Figure 18:
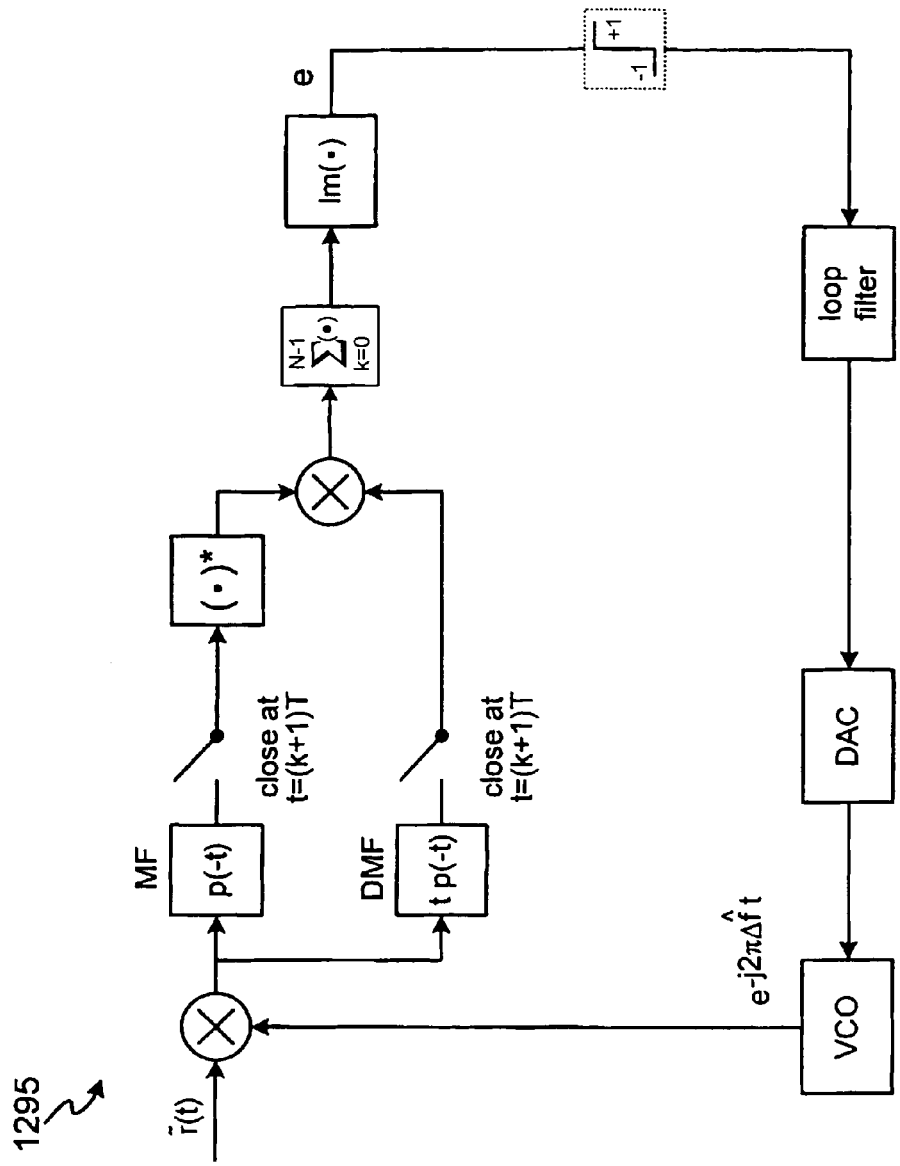
FIG. 18 is a block diagram of a closed-loop frequency estimator 1295 for a suppressed carrier signal with unknown data.
Figure 19:
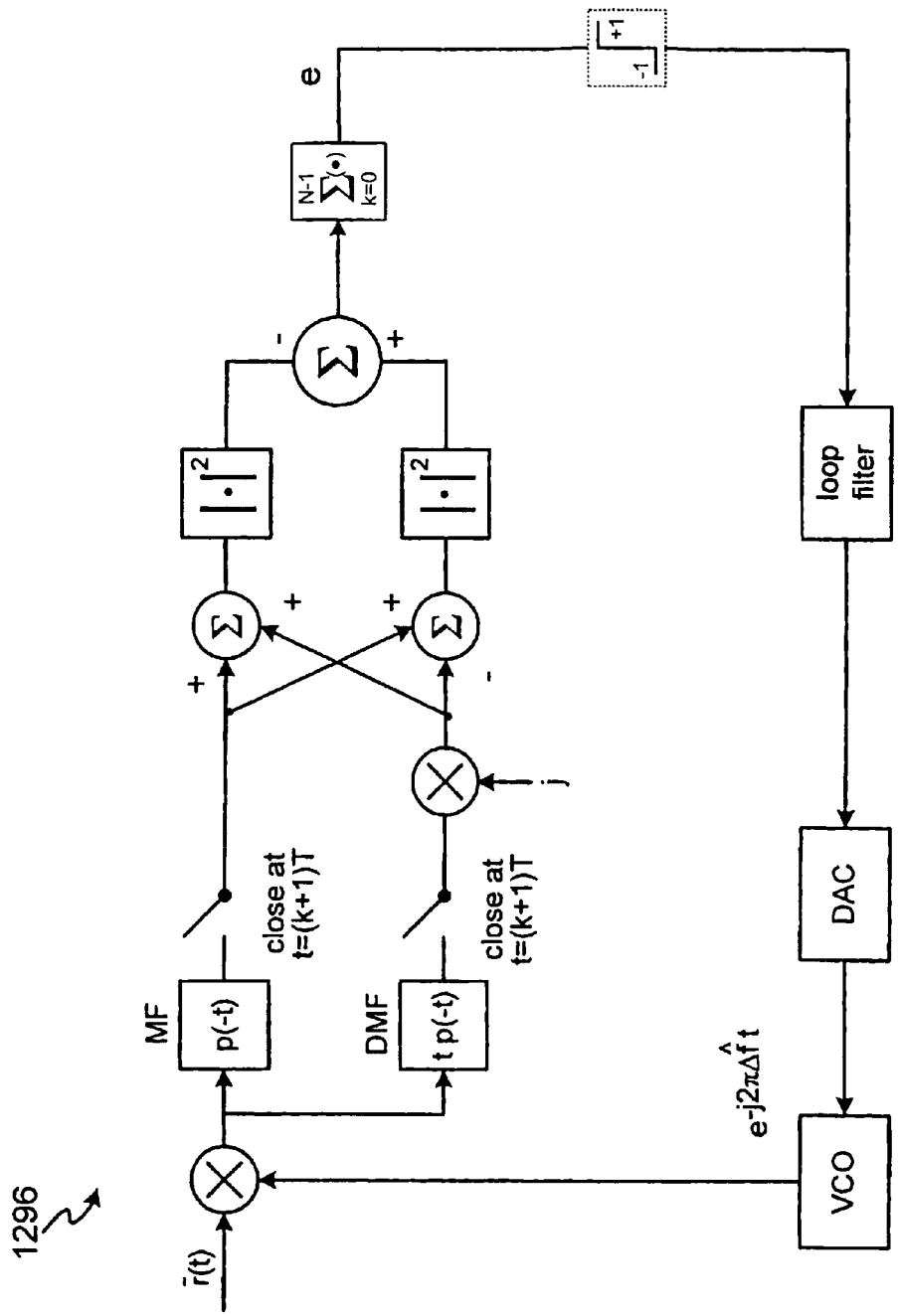
FIG. 19 is a block diagram of a closed-loop frequency estimator 1296 for a suppressed carrier signal with unknown data.

FIG. 18 is a block diagram of a closed-loop frequency estimator 1295 using the error signal detector given by (21B) in accordance with one exemplary embodiment of the invention. Similarly, a block diagram of one embodiment of a closed-loop frequency estimator 1296 using the error signal detector given by (23) is shown in FIG. 19. Closed-loop frequency estimators 1295 and 1296 include mixed analog and digital.

All digital versions of other closed-loop estimators can be obtained in a similar manner and are contemplated by the invention.

Referring again to FIG. 1, after the modulation index is estimated, the incoming signal is transmitted to JEM 130. In accordance with one exemplary embodiment of the invention, JEM 130 includes a data format/pulse shape module 132 to determine the waveform shape and pulse of the incoming signal. In another embodiment, JEM 130 includes a signal-to-noise ratio (SNR) module 134 to determine the strength of the incoming signal relative to background noise. JEM 130, in yet another exemplary embodiment, includes a data rate module 136 to determine the data rate of the incoming signal. In still another exemplary embodiment, JEM 130 includes a coarse symbol synchronizer (CSS) 138 to provide symbol timing to various components of the radio receiver. In accordance with one exemplary embodiment of the invention, JEM 130 includes at least two of data format/pulse shape module 132, SNR 134, data rate 136, and symbol synchronizer 138. In accordance with another exemplary embodiment, JEM 130 includes at least three of data format/pulse shape module 132, SNR 134, data rate 136, and symbol synchronizer 138. In yet another exemplary embodiment, JEM 130 includes each of data format/pulse shape module 132, SNR 134, data rate 136, and symbol synchronizer 138. Furthermore, each of data format/pulse shape module 132, SNR 134, data rate 136, and symbol synchronizer 138 perform their respective functions at substantially the same time.

Date format module 132, in one exemplary embodiment, is configured to determine whether the incoming signal includes non-return to zero (NRZ) encoding or Manchester encoding. Furthermore, date format module 132 is configured to determine NRZ encoding or Manchester encoding for Binary Phase-Shift Keying (BPSK) signals and/or Quadrature Phase Shift Keying (QPSK) signals, and whether these signals are coherently classified (i.e., one encoding format is always used on a specific carrier type (e.g., NRZ is always used on a suppressed carrier)) or non-coherently classified (i.e., independent of the encoding format, the modulations are assumed to be a fully suppressed carrier).

In accordance with one exemplary embodiment of the invention, date format module 132 includes a coherent data format classifier 1321 for determining NRZ encoding or Manchester encoding for an incoming BPSK signal with a low SNR. Again, supposing the incoming signal is represented in passband by:

$$r(t) = 2\sqrt{2P}\left(\sum_{n=-\infty}^{\infty} c_n p(t - nT)\right)\cos\omega_c t + n(t) \quad (24)$$

where P is the signal power, $\{c_n\}$ is the sequence of binary independent, identically distributed (iid) data taking on values $\pm 1$ with equal probability, p(t) is the pulse shape (the item to be classified), $\omega_c$ is the radian carrier frequency, $1/T$ is the data (symbol) rate and n(t) is a bandpass additive white Gaussian noise (AWGN) source with single-sided power spectral density $N_0$ W/Hz. Then a classification choice between the two pulses shapes based on the LLF would be to choose Manchester if:

$$\sum_{k=0}^{K-1} \ln \cosh\left(\frac{2\sqrt{2P}}{N_0} r_k(1)\right) < \sum_{k=0}^{K-1} \ln \cosh\left(\frac{2\sqrt{2P}}{N_0} r_k(2)\right) \quad (25)$$

where $$\hat{\epsilon} = \frac{n_{i-1}}{B^{l_{max}-(i-1)} N_{\hat{\epsilon},b} - 1}$$

For low SNR, (25) simplifies to:

$$\sum_{k=0}^{K-1} \int_{kT}^{(k+1/2)T} r(t)\cos\omega_c t\, dt \int_{(k+1/2)T}^{(k+1)T} r(\tau)\cos\omega_c \tau\, d\tau < 0 \quad (26)$$

For high SNR, (25) reduces to:

$$\sum_{k=0}^{K-1} \left| \int_{kT}^{(k+1/2)T} r(t)\cos\omega_c t\, dt + \int_{(k+1/2)T}^{(k+1)T} r(\tau)\cos\omega_c t\, dt \right| < \quad (27)$$

$$\sum_{k=0}^{K-1} \left| \int_{kT}^{(k+1/2)T} r(t)\cos\omega_c t\, dt - \int_{(k+1/2)T}^{(k+1)T} r(t)\cos\omega_c t\, dt \right|$$

Note that while the optimum classifier of (25) requires knowledge of SNR, the reduced-complexity classifier (27) does not.

Figure 20:
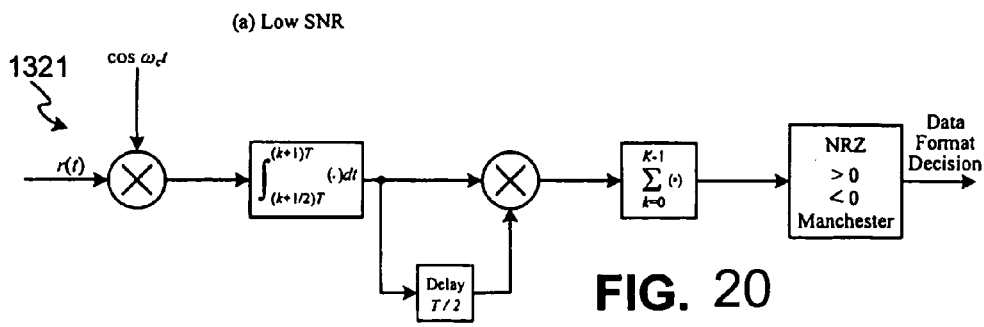
FIG. 20 is a block diagram of one embodiment of a low SNR data format classifier 1321 for a binary phase-shift keying (BPSK) signal.
Figure 21:
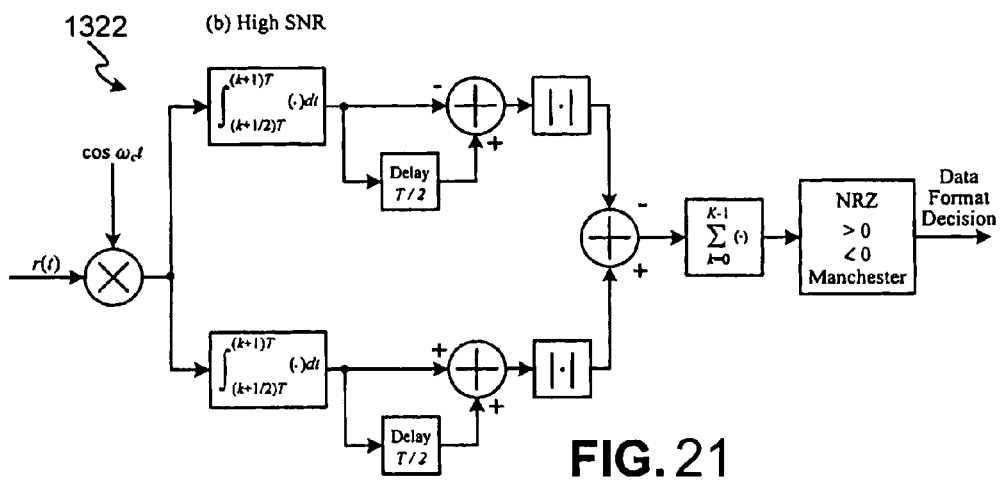
FIG. 21 is a block diagram of an embodiment of a high SNR data format classifier 1322 for a BPSK signal.

FIG. 20 is a block diagram of one embodiment of a low SNR classifier 1321 defined by (26) and FIG. 21 is a block diagram of an embodiment of a high SNR classifier 1322 defined by (27).

For QPSK modulation, low SNR, the classification decision would be based on the inequality:

$$\sin[(M/2)\phi] \quad (28)$$

Figure 22:
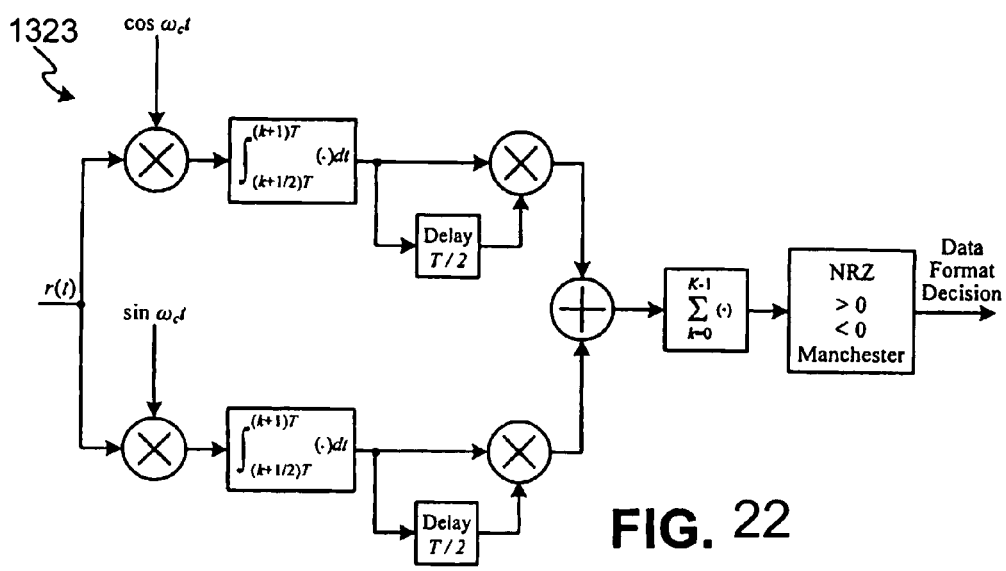
FIG. 22 is a block diagram of a low SNR coherent data format classifier 1323 for quadrature phase-shift keying (QPSK) modulation.

FIG. 22 is a block diagram one exemplary embodiment of a coherent data classifier 1323 for QPSK modulation having low SNR.

For high SNR, the following equation is equivalent to (27) for the non-coherent high SNR case:

$$\sum_{k=0}^{K-1} \left| \int_{kT}^{(k+1/2)T} r(t) e^{j\omega_c t}\, dt + \int_{(k+1/2)T}^{(k+1)T} r(t) e^{j\omega_c t}\, dt \right| < \quad (30)$$

$$\sum_{k=0}^{K-1} \left| \int_{kT}^{(k+1/2)T} r(t) e^{j\omega_c t}\, dt - \int_{(k+1/2)T}^{(k+1)T} r(t) e^{j\omega_c t}\, dt \right|$$

Figure 23:
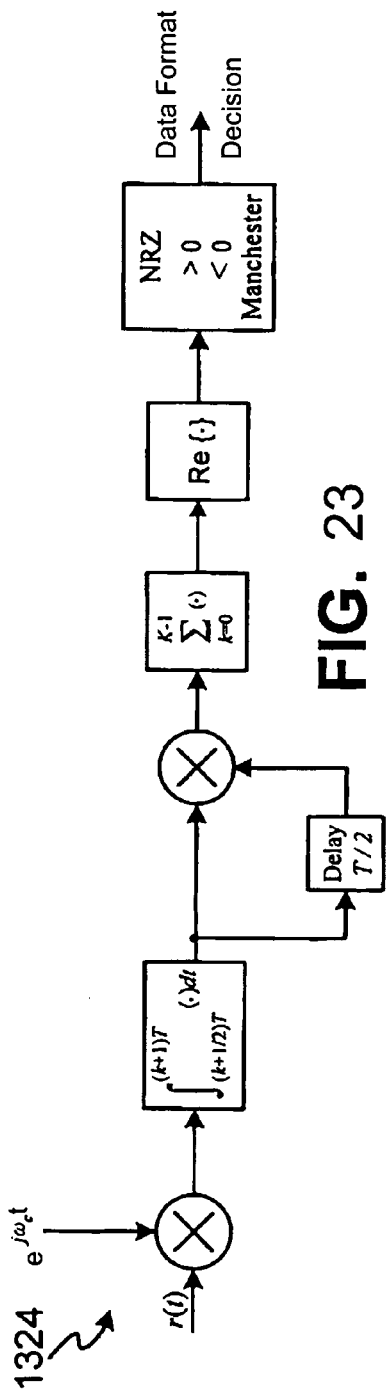
FIG. 23 is a block diagram of a reduced complexity low SNR data format classifier 1324 for BPSK modulation.
Figure 24:
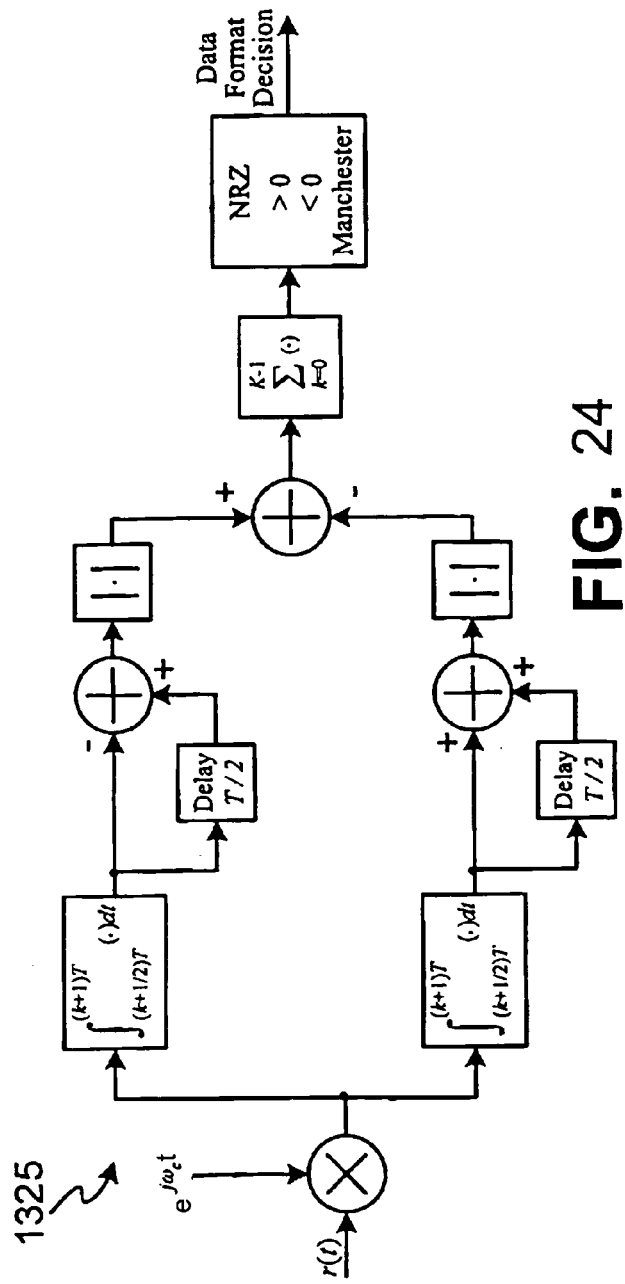
FIG. 24 is a block diagram of one exemplary embodiment of a reduced complexity high SNR data format classifier 1325 for BPSK modulation.

FIG. 23 is a block diagram of one exemplary embodiment of a low SNR classifier 1324 defined by (29) and FIG. 24 is a block diagram of one exemplary embodiment of a high SNR classifier 1325 defined by (30).

The solution to the problem of making an ML decision on the pulse shape of a modulation from a variety of different possibilities, in principle, follows the identical procedure as discussed above for data format classification, except for the fact that they are no longer restricted to digital pulse waveforms.

Of the many measures that characterize the performance of a communication receiver, signal-to-noise ratio (SNR) is perhaps the most fundamental in that many of the other measures directly depend on its knowledge for their evaluation. Thus, it is desirable that the estimation of SNR take place with as little known information as possible regarding other system parameters such as carrier phase and frequency, order of the modulation, data symbol stream, data format, and the like. In one exemplary embodiment of the invention, SNR module 134 is configured to estimate and/or determine the signal-to-noise ratio with as little known information (e.g., carrier phase and frequency, order of the modulation, data symbol stream, data format, and the like) as possible. In accordance with an aspect of one exemplary embodiment of the invention, SNR module 134 includes a modified split-symbol moments estimator (SSME) 1341, wherein FIG. 25 is a block diagram illustrating an embodiment of SSME 1341.

Figure 25:
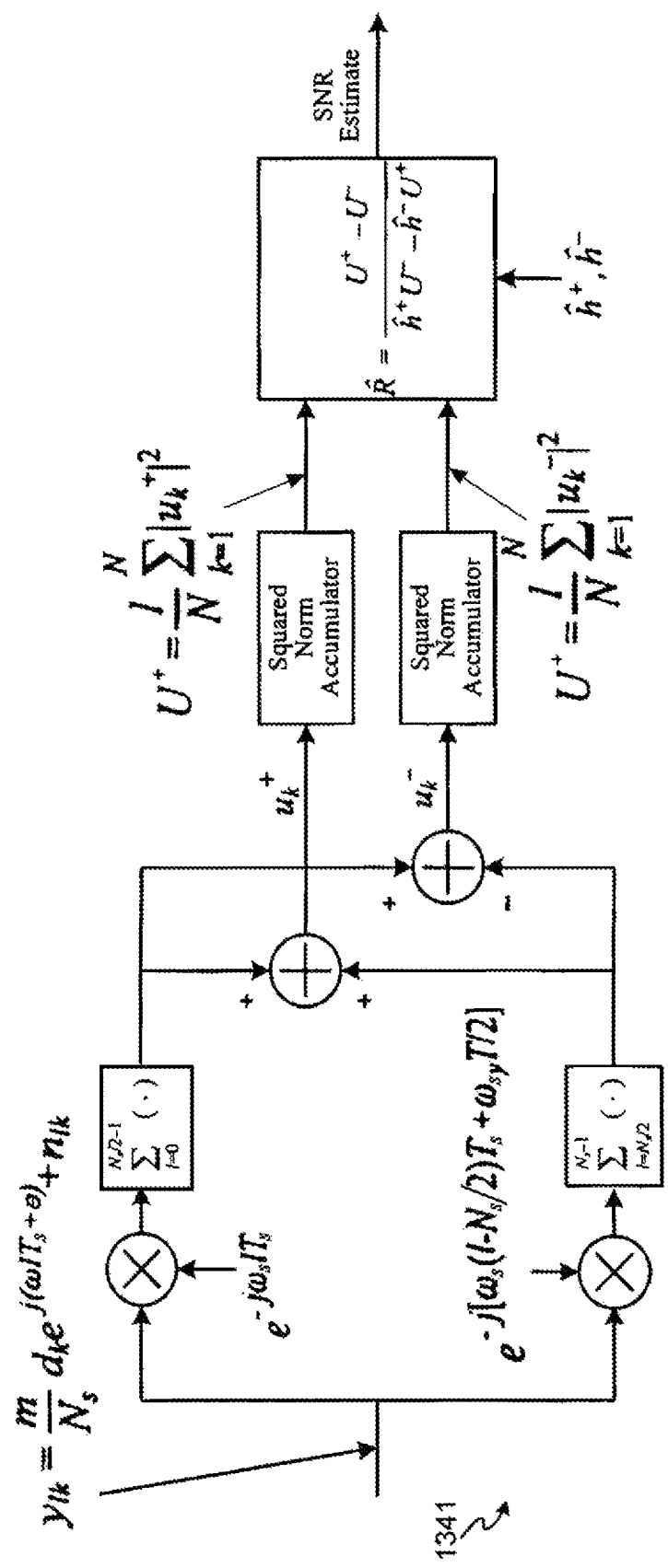
FIG. 25 is a block diagram illustrating an embodiment of SSME SNR estimator 1341 for M-ary phase shift keying (MPSK) modulation, sampled version.
Figure 26:
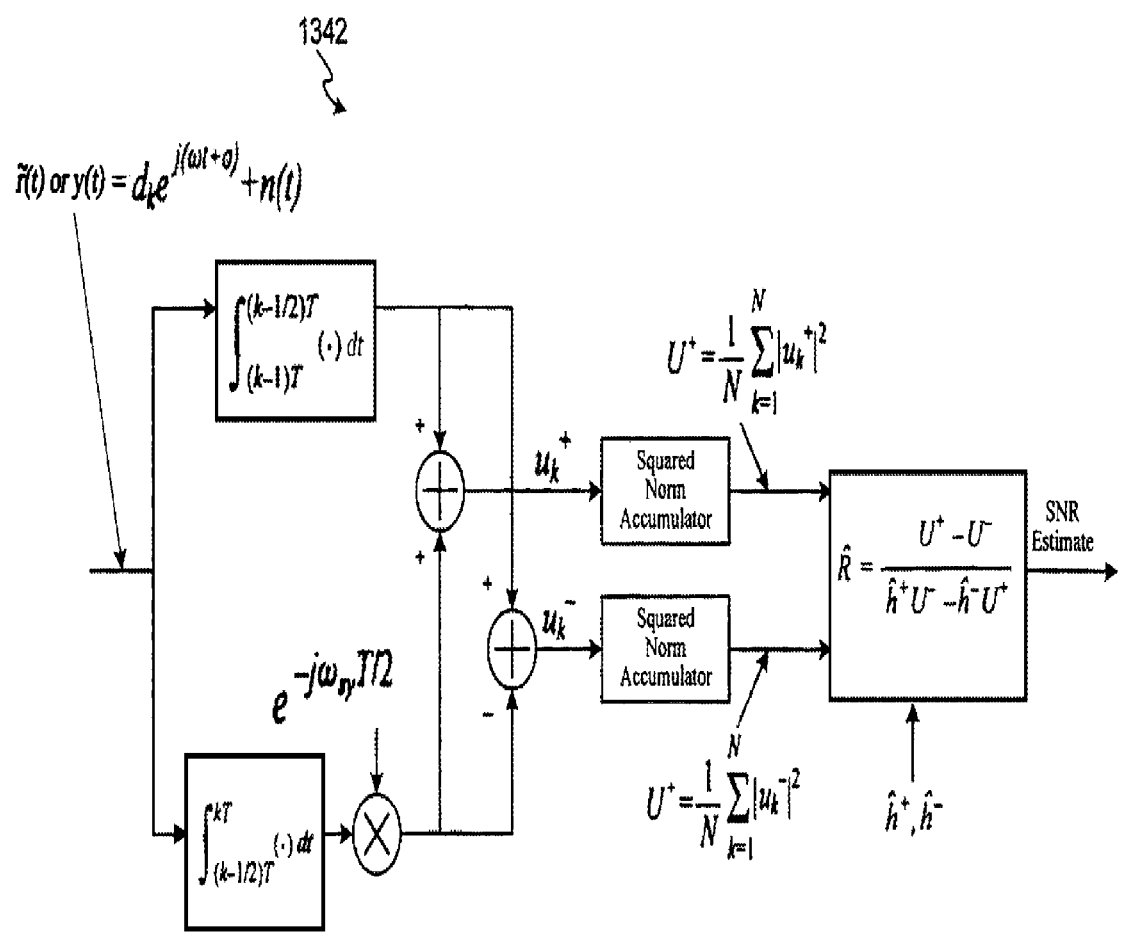
FIG. 26 is a block diagram of a complex baseband SSME SNR estimator 1342 for MPSK modulation, integrate and dump version.

FIG. 26 is a block diagram of a complex baseband SSME 1342 obtained by replacing the half-symbol accumulators in FIG. 25 by half-symbol I&Ds.

Besides being used for phase compensation of the samples or half-symbols that enter into the expressions for computing $U^{\pm}$, the frequency estimate also enters into play in determining the estimates $\hat{h}^{\pm}$ that are computed from $h^{\pm}$ by replacing $\omega$ with its estimate $\hat{\omega}$. Thus, the performance of SSME 1341 and 1342 will depend on the accuracy of the frequency estimate $\hat{\omega}$ with or without phase compensation. In the most general scenario, a taxonomy of cases for analysis is illustrated by the tree diagram of FIG. 27 for the sampled version of the SSME 1341. FIG. 27 begins at the square node in the middle and proceeds outward to any of the eight leaf nodes representing combinations of $\omega$, $\hat{\omega}$, $\omega_{sy}$, and $\omega_s$. For SSME 1342, a few of the tree branches of FIG. 27, namely, 2c and 3c, do not apply.

SSMEs 1341 and 1342 assume that the symbol timing is either known or could be estimated perfectly. In another exemplary embodiment, the SNR estimator includes SSME 1343 (FIG. 28) to determine the SNR when symbol timing is imperfect but the carrier frequency is known (but the carrier phase is still assumed unknown).

A generalized SSME structure that provides improved performance in the sense of lowering the variance of SNR module 134 will now be disclosed. To simplify matters, consider the ideal case of no frequency uncertainty and SSME 1342. Suffice it to say that the generalization is readily applied to SSME 1341 in a manner readily attainable by one of ordinary skill in the art. A generalized SSME is such that for a fixed observation time the quality of SNR module 134 continues to improve with increasing SNR.

Even though the optimized generalized SSME requires (in principle) very precise prior knowledge of the true value of R, its performance can be reasonably well approximated by that of a robust estimator $\hat{R}_b$, using a very coarse prior estimate of R.

Figure 28:
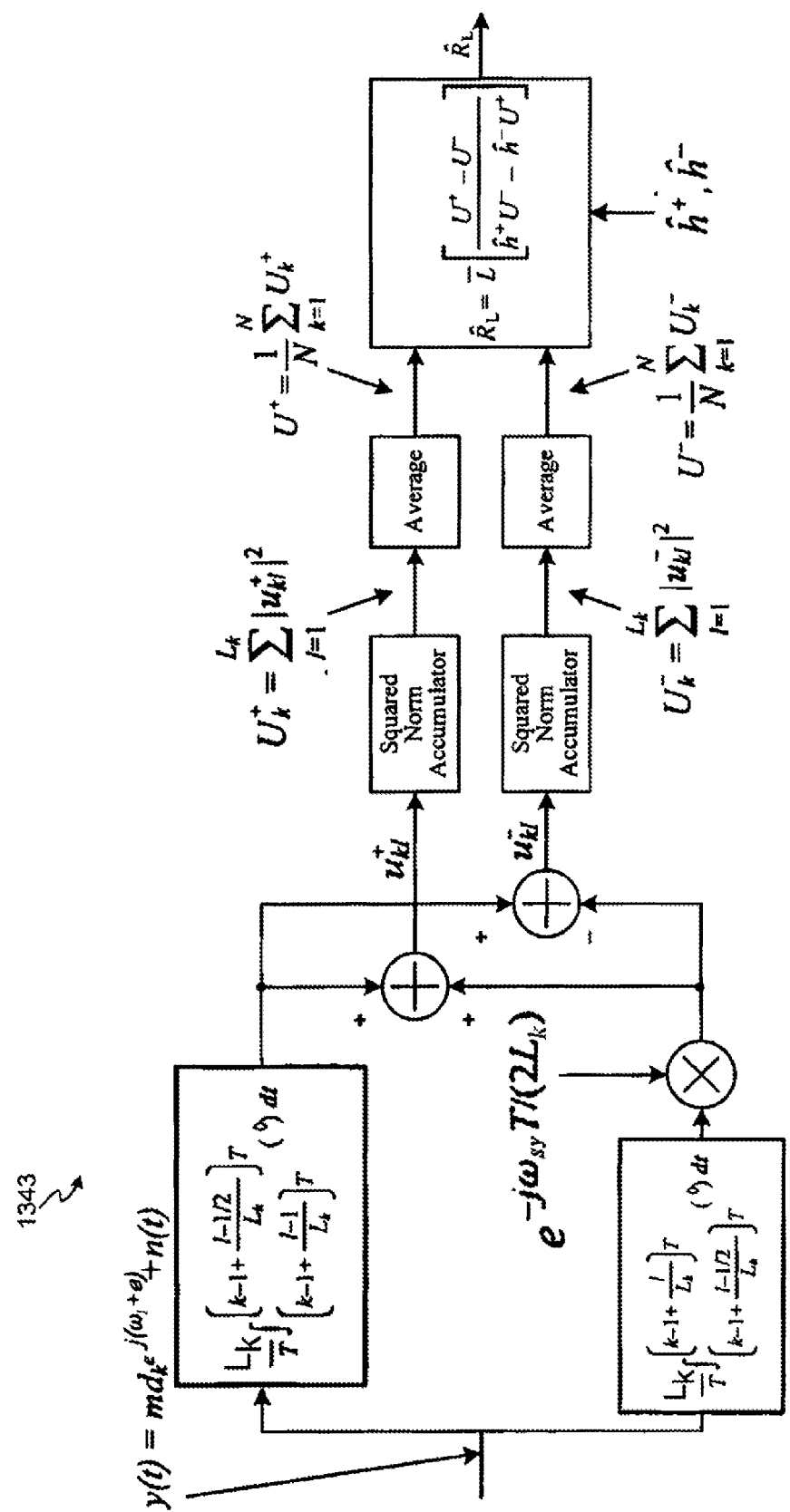
FIG. 28 is a block diagram of one exemplary embodiment of time-multiplexed SSME SNR estimator 1346 for MPSK modulation.

Similar to the generalized SSME $\hat{R}_L$ is based on complex-valued samples, the generalized SSME $\hat{R}_L$ based on real-valued samples may be optimized with respect to its asymptotic performance expressions FIG. 28 is a block diagram of one exemplary embodiment of time-multiplexed SSME 1343.

The equations defining both the time-multiplexed estimator $R_L$ (SSME 1343) and the underlying observables $U^{\pm}$ in terms of standard chi-squared random variables are identical in form to those obtained for the special case of uniform sub-sampling of all the symbols, L=(L, L, . . . , L).

Figure 29:
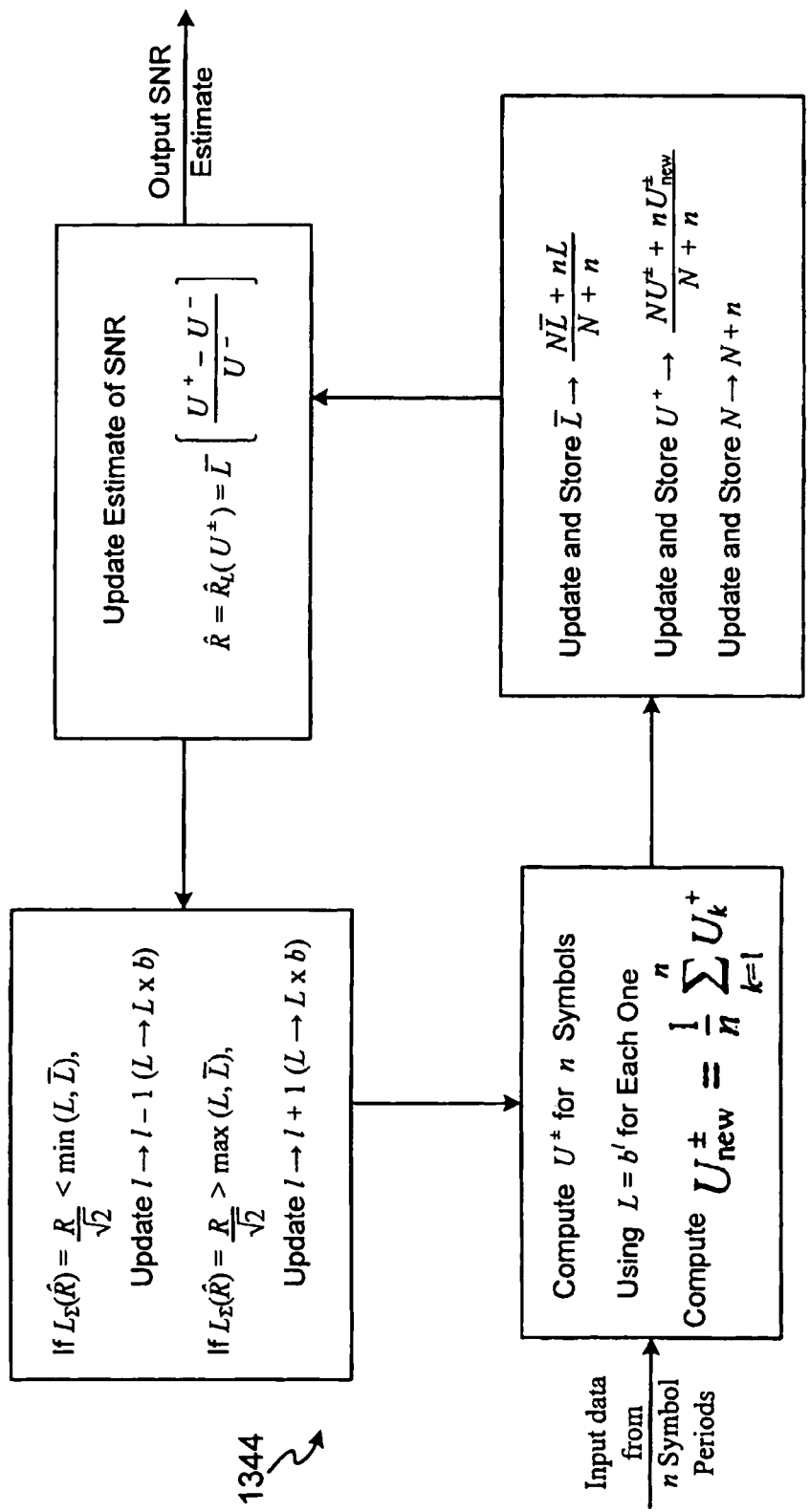
FIG. 29 is a flow diagram of one exemplary embodiment of an adaptive scheme 1344 for SNR estimation of MPSK modulation.

FIG. 29 is a flow diagram of one exemplary embodiment of an adaptive scheme 1344 modeled after the robust version of the generalized SSME $\tilde{R}_L$ discussed above, wherein the integer values of L are restricted to the set $b^l=0, 1, 2, 3, \ldots$ for some integer base b.

Thus far, the behavior and performance of the SSME for the class of M-PSK (M≧2) modulations with and without frequency uncertainty have been discussed. In various other exemplary embodiments, SNR module 134 includes an SSME structure to provide SNR estimation for offset QPSK (OQPSK) as well as non-constant envelope modulations such as QAM. As before, the performance of the estimator is still independent of the data symbol sequence as well as the carrier phase and allows for the same enhancement by increasing the number of pairs of observables per symbol in accordance with the true value of SNR.

For the case of M-PSK, it was noted that the kth transmitted complex symbol in the interval (k−1) T≦t≦kT can be represented in the form $d_k = e^{j\phi_k}$ where $\phi_k$ takes on one of M phases uniformly spaced around the unit circle. A special case of the above corresponding to M=4 results in conventional QPSK. It is well-known that on nonlinear channels OQPSK provides a performance advantage since it reduces the maximum fluctuation in the signal amplitude by limiting the maximum phase change to 135° rather than 180°. Since for OQPSK, the complex representation of a symbol extends over 1½ symbols (because of the offset between the I and Q channels), it cannot conveniently be represented in the polar form $d_k = e^{j\phi_k}$ as above. Rather, the I and Q channel modulations are considered separately. For convenience, SSME 1342 is discussed, however, the same conclusions also apply to SSME 1341.

For implementing a universal SSME structure 1349 that will handle OQPSK as well as conventional QPSK, the results of inputting the I and Q channel baseband signals to half-symbol I&Ds are partitioned into even and odd outputs.

Date rate module 136, in one exemplary embodiment, is configured to determine and/or estimate the data rate of the incoming signal. Knowledge of this parameter is important in carrying out ML detection of other parameters such as the carrier phase or modulation type. Here, the data rates are assumed to come from a set of known values and related by integer powers of an integer base B. This assumption allows estimation of the true data rate based on estimates of the signal-to-noise ratio (SNR) computed for various assumed data rates. In one embodiment, the SNR utilized is SSME 1341 and/or SSME 1342 discussed above. These estimators are appealing in that the only parameter required for their operation is the assumed data rate. Hence, estimation of the data rate can be done jointly with that of the SNR.

Though this approach provides a way of estimating both the data rate and SNR together, it will be shown that it is sensitive to symbol timing error or jitter. In fact, the presence of symbol timing error can severely degrade the performance of this estimator. To overcome this, a modification is proposed in which the jitter is quantized and estimated alongside the data rate and SNR. This approach, based on a so-called generalized likelihood ratio test (GLRT), is robust in the presence of symbol timing error and can be used to jointly estimate the data rate, SNR, and symbol timing error all at once. The estimates of the symbol timing error obtained can then be used as coarse initial estimates for the data transition tracking loop (DTTL), which is used later in the receiver to obtain a fine estimate of the timing.

The baseband signal received at the autonomous radio is assumed to consist of a constant amplitude digital data stream corrupted by artifacts due to the conversion from IF to baseband as well as additive noise. Mathematically, the received signal $\tilde{r}(t)$ is assumed to have the following form in the complex baseband representation:

$$\tilde{r}(t) = A\left(\sum_{k=-\infty}^{\infty} d_k p(t-(k+\varepsilon)T)\right)e^{j(\omega_r t + \theta_c)} + \tilde{n}(t) \quad (32)$$

Here, the following is true:
A = signal amplitude;
$d_k$ = kth data symbol (typically assumed to be an M-PSK symbol);
p(t) = data pulse shape (typically either an NRZ or a Manchester pulse);
T = symbol period of the data;
$\varepsilon$ = symbol timing error (jitter) (assumed to be uniform over the interval [0,1));
$\omega_r$ = residual frequency offset after demodulation;
$\theta_c$ = carrier phase (assumed to be uniform over the interval [0,2π)); and
$\tilde{n}(t)$ = complex additive white Gaussian noise (AWGN) whose real and imaginary parts are uncorrelated, zero mean processes with power spectral density (psd)

$$\frac{N_0}{2}.$$

Prior to estimating parameters such as the carrier phase $\theta_c$ or the frequency offset $\omega_r$, the data rate given is estimated by R≡1/T.

In one embodiment the SNR utilized is SSME 1341 for estimating $\tilde{r}$ (t) from (32) for the case of a rectangular NRZ pulse shape. (Notably, for different pulse shapes, the only thing that needs to be changed is that the half-symbol integrate & dump (I&D) circuits need to be replaced with half-symbol matched filters) Here, T denotes the assumed symbol period of the system (i.e., the sample period), N denotes the number of system observations, and $\omega$, $\hat{h}^+$ and $\hat{h}^-$ denote frequency and phase compensation factors as described above.

The data rate estimation algorithms above are used to jointly estimate the data rate, SNR, and symbol timing error. Even with a coarse quantization of the symbol timing error, a rather robust estimation of the data rate in the presence of jitter is obtained. Once a reliable estimate of the data rate has been made, the DTTL can then be used to obtain a finer estimate of the symbol timing error. Furthermore, the coarse estimate of the jitter can be used as an initial condition for the DTTL which may reduce the computation time required for convergence.

As the data rate of the received signal is not known a priori, at radio receiver 100 the symbol timing error corresponding to one specific data rate is one thing that can be independently quantized. By quantizing the jitter corresponding to one data rate, the quantized jitter for the remaining rates may be automatically determined. Furthermore, SSME 1341 is also a generalized structure to account for the quantized symbol timing error, and to account for computing an ensemble average of the observed SNRs. An ensemble average of the observed SNRs is important in estimating the mean of the SNR of the SSME system.

To incorporate the estimation of the quantized symbol timing error, JEM 130 includes CSS 138 which is described in the following algorithms.

Figure 30:
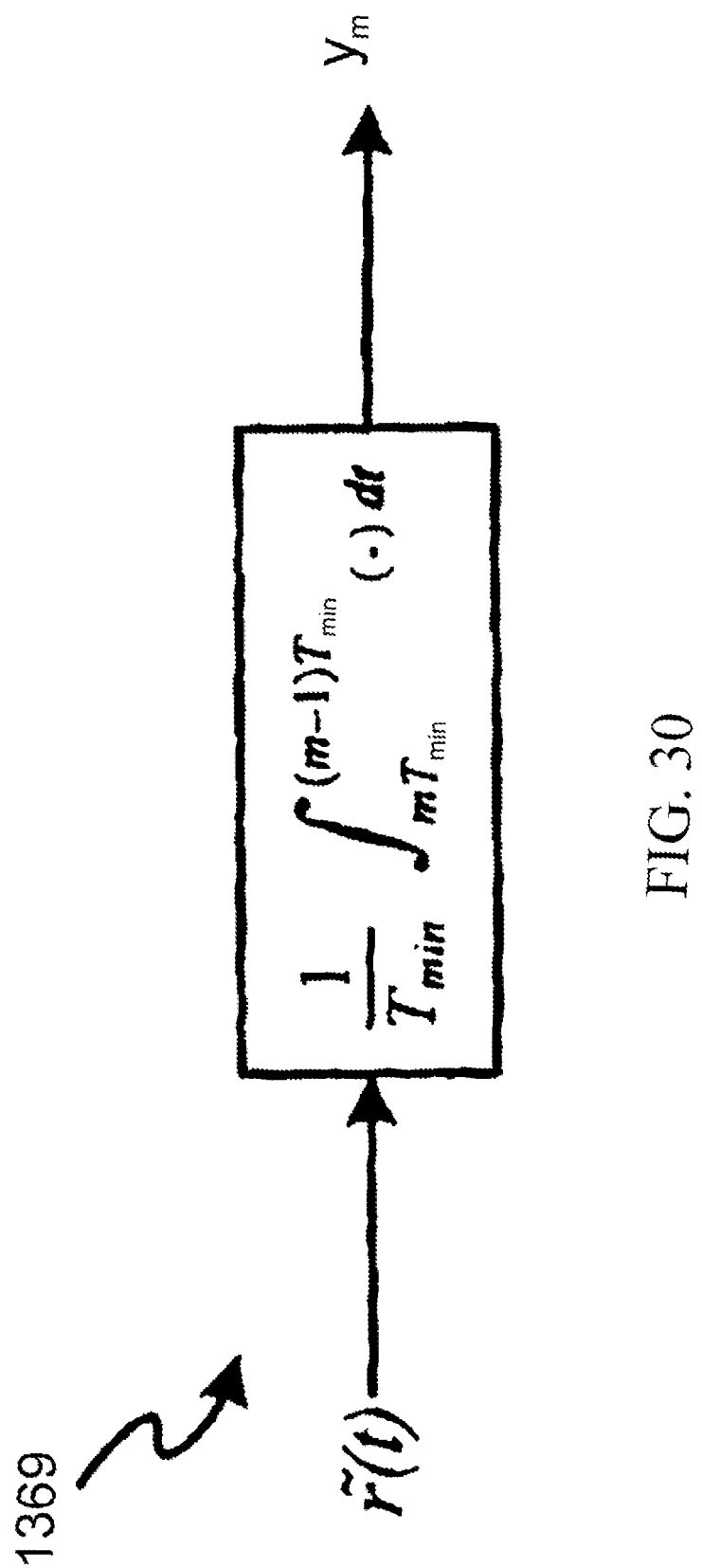
FIG. 30 is a block diagram of a system to finely integrate and sample a continuous time signal to obtain a high rate discrete-time signal.
Figure 31:
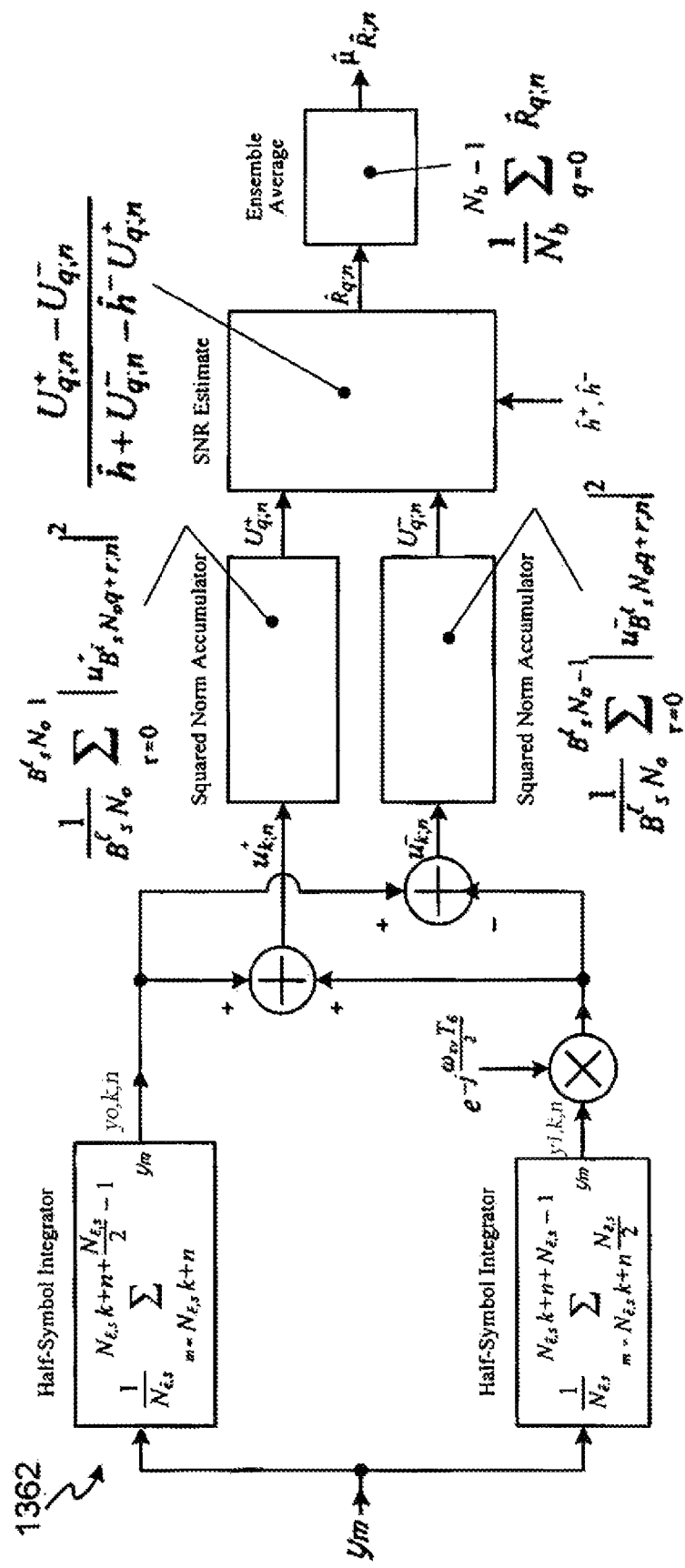
FIG. 31 is a digital implementation of a SSME-based data rate estimation system 1362.

1. Calculate the sequence $y_m$ from FIG. 30 over the range of values given;

2. Run the SSME of FIG. 26 at the highest data rate $R_s = B^{lmax}R_b$. Calculate $\mu\hat{R}_{j;n}$ for all n and define $n_0 \equiv \text{argmax } \mu_{\hat{R};j;n}$ and $\hat{\mu}_{\hat{R}_o} \equiv \mu_{\hat{R};n_o}$. Set i=1;

3. Lower the assumed data rate by one step, i.e., set $$R_{s,new} = \frac{1}{B} R_{s,old},$$

and run the SSME. Calculate $$\mu_{\hat{R};n},$$

for all n and define $$n_i \equiv \underset{n}{\text{argmax}} \mu_{\hat{R};n} \text{ and } \mu_{\hat{R}_i} \equiv \mu_{\hat{R};n_i}.$$

$\hat{\mu}_{\hat{R}_i} = \hat{\mu}_{\hat{R};n_i}.$

4. If $\hat{\mu}_{\hat{R}_i} \geq \hat{\mu}_{\hat{R}_{i-1}}$, increment i by 1 and go to Step 3. Otherwise, estimate the data rate, SNR, and symbol timing error as follows:

$\hat{R} = B^{lmax-(i-1)}R_b$ $\hat{\mu}_{\hat{R}_i} = \hat{\mu}_{\hat{R}_{i-1}}$ $$\hat{e} = \frac{n_i - 1}{B^{lmax-(i-1)}N_{\hat{e},b} - 1}$$

As discussed above, for each assumed data rate, the SSME is run for each value of the quantized symbol timing error. The SNR and jitter for that data rate are then estimated to be the largest SNR and the jitter value leading to this maximum SNR. This data rate estimation technique halts as soon as the condition $\hat{\mu}_{\hat{R}_i} = \hat{\mu}_{\hat{R}_{i-1}}$, is not satisfied. This may lead to a premature termination of the algorithm. To prevent a premature halting of the algorithm, a GLRT-type modification is utilized. This GLRT-type estimation algorithm is based on the principle that the true data rate and symbol timing error should yield the largest value of the mean of the SNR. Incorrect values of these quantities, on the other hand, should lead to a degraded estimate of the SNR mean. As opposed to the previous algorithm, which lowers the assumed data rate until the SNR decreases, this algorithm computes the SNR for all data rates and all jitter values. The advantage to this is that it can prevent the algorithm from prematurely terminating, which can easily happen when the true SNR is low.

With reference to data rate module 136, carrier synchronization techniques have been developed assuming that the modulation format and signal constellation characteristics are known a priori. In other words, the modulation index is chosen so that either the carrier is fully suppressed or a residual carrier component remains. Notably, constellation characteristics refers to the shape of the constellation (e.g., a circle for multiple-phase shift keying (M-PSK) or a square for quadrature amplitude modulation (QAM)), and its size in terms of the number of signal points it contains. Aside from knowing the modulation index and signal constellation structure, it is also customary to have knowledge of the data rate and type (e.g., NRZ versus Manchester code) since the true optimum design of the loop depends on this information.

For radio receiver 100, the most optimistic situation would be that the receiver contains a carrier synchronization structure that is capable of tracking the carrier phase independent of the above-mentioned considerations. While this is not completely possible since, for example, a squaring loop (or equivalently a BPSK Costas loop) cannot track a QPSK modulation and likewise a $4^{th}$ power loop (or equivalently, a QPSK Costas loop, sometimes referred to as an inphase-quadrature (I-Q) loop) cannot properly track a BPSK signal. Nevertheless, while in principle each carrier synchronization loop developed for a given modulation format, constellation, and data rate/type has certain unique characteristics, they do share a number of similarities (e.g., a common front end demodulator structure, that allows one to consider designs that could be operational in the absence of complete a priori knowledge of all of these characteristics). For example, if the modulation is restricted to the M-PSK class, then it is possible to construct a universal structure that performs the carrier synchronization function for all values of M. This structure is derived by first determining the maximum a posteriori (MAP) estimate of carrier phase based on an observation of the received signal, namely, M-PSK plus additive white Gaussian noise (AWGN) and then using this to motivate a closed loop carrier synchronization loop. By making an analogy between the closed loop bandwidth and the noise bandwidth of an integrate-and-dump (I&D) filter of duration equal to the observation time for the open loop MAP estimate, the closed loop approaches the Cramer-Rae lower bound on the variance of an unbiased estimate of the phase of a modulated carrier.

Still further, if the modulation is known to be other than suppressed carrier (i.e., a modulation index less than $\pi/2$ radians), then it is still possible to exploit the power in both the data and residual carrier components for carrier tracking purposes provided one has knowledge of the modulation index itself. Such knowledge could be derived non-coherently (i.e., in the absence of carrier synchronization) from a suitable modulation index estimator. Loops of this type are often referred to as "hybrid carrier tracking loops," and like their suppressed carrier counterparts, are motivated by the same MAP considerations.

In various exemplary embodiments, the matched filters in the I and Q arms of the loop are replaced with simple low pass filters to make the carrier synchronizer operation somewhat independent of the exact pulse shape, but without some attendant loss in performance. These systems include a fixed modulation bandwidth which implies a fixed data symbol rate for all values of M. These systems include simplifications based on low SNR approximations applied to the nonlinearities inherent in the MAP phase estimate. When this is done, the error signal in the loop for M-PSK is of the form sin M$\phi$, where $\phi$ is the loop phase error, which from simple trigonometry can be written as sin M$\phi$=2 sin [(M/2)$\phi$] cos [(M/2)$\phi$]. Thus, it is seen that the error signal in the loop for M-PSK is formed from the product of the error signal sin [(M/2)$\phi$] and the lock detector signal cos [(M/2)$\phi$] in the loop for M/2-PSK modulation. This relationship forms the basis for implementing a universal structure.

In the past, carrier synchronization loops have typically fallen into two categories: those that track a discrete carrier (e.g., the phase-locked loop (PLL)) and those that track a fully suppressed carrier (e.g., the Costas loop). A fully suppressed carrier comes about when a digital modulation is impressed on a carrier with a modulation index equal to $\pi/2$ radians, whereas a discrete (residual) carrier component appears in the spectrum when the modulation is less than $\pi/2$ radians.

For implementing a universal SSME structure that will handle OQPSK as well as conventional QPSK, the results of inputting the I and Q channel baseband signals to half symbol I&Ds are partitioned into even and odd inputs. SNR estimator 134 can use the other embodiments SSME 1341-1344 for estimating SNR when QAM is transmitted.

Date rate module 136, in one exemplary embodiment, is configured to determine and/or estimate the data rate of the incoming signal. Knowledge of this parameter is important in carrying out ML detection of other parameters such as the carrier phase or modulation type. Here, the data rates are assumed to come from a set of known values and related by integer powers of an integer base B. This assumption allows estimation of the true data rate based on estimates of the signal-to-noise ratio (SNR) computed for various assumed data rates. In one embodiment, the SNR utilized is SSME 1341 and/or SSME 1342 discussed above. These estimators are appealing in that the only parameter required for their operation is the assumed data rate. Hence, estimation of the data rate can be done jointly with that of the SNR.

Though this approach provides a way of estimating both the data rate and SNR together, it will be shown that it is sensitive to symbol timing error or jitter. In fact, the presence of symbol timing error can severely degrade the performance of this estimator. To overcome this, a modification is proposed in which the jitter is quantized and estimated alongside the data rate and SNR. This approach, based on a so-called generalized likelihood ratio test (GLRT), is robust in the presence of symbol timing error and can be used to jointly estimate the data rate, SNR, and symbol timing error all at once. The estimates of the symbol timing error obtained can then be used as coarse initial estimates for the data transition tracking loop (DTTL), which is used later in the receiver to obtain a fine estimate of the timing.

To account for the presence of symbol timing error, typically a digital transition tracking loop (DTTL) is used. However, the DTTL architecture requires knowledge of the data rate to function as required. To overcome this restriction, the proposed SSME based data rate estimator can be modified to provide a coarse estimate of the symbol timing error in addition to the data rate, which can then be used to obtain a finer estimate of the symbol timing error using a DTTL. As the data rate of the received signal is not known a priori, at radio receiver 100 the symbol timing error corresponding to one specific data rate is one thing that can be independently quantized. By quantizing the jitter corresponding to one data rate, the quantized jitter for the remaining rates may be automatically determined.

As the number of quantization steps increases exponentially as the assumed data rate decreases, it is tempting to think that a better estimate of the data rate, SNR, and symbol timing error for lower true data rates than for higher rates will be obtained. However, this is offset by the fact that for a fixed observation time interval, an exponentially larger number of observations for higher true data rates than for lower ones is obtained. Hence, there is an implicit tradeoff between the number of signal observations and the number of jitter quantization levels for each true data rate.

One of the advantages of uniformly quantizing the symbol timing error to $N_{e\epsilon,s}$ steps is that it leads to an efficient all digital implementation of the SSME system.

Furthermore, SSME 1341 is also a generalized structure to account for the quantized symbol timing error, and to account for computing an ensemble average of the observed SNRs. An ensemble average of the observed SNRs is important in estimating the mean of the SNR of the SSME system. To do this, the discrete-time signal $y_m$ is partitioned into blocks over which the SNR is to be computed. For each block, the SSME computes an estimate of the SNR and then an ensemble average of the SNR is computed over the blocks.

There are several things to note regarding the structure of all digital SSME system 1362. First, all digital SSME system 1362 includes discrete summations analogous to the sampled version of the SNR estimator discussed above with regard to SNR 134. Furthermore, note that all of the signals starting from the half signal integrator outputs are indexed with a semicolon followed by n. Finally, note that to form a single SNR estimate, a total of $B^{I_s}N_{obs}$ samples are squared and accumulated. This was chosen as such here to keep the total observation time interval or epoch block fixed.

All other things being equal, a modulation classifier that requires the least knowledge of channel parameters is preferred. If a classifier required only as, for example, it would be preferred over one requiring $P_t$ and $\sigma^2$ separately.

Figure 32:
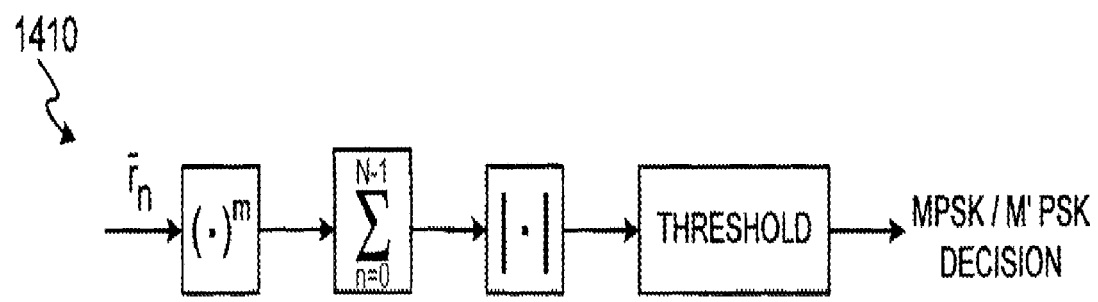
FIG. 32 is a block diagram of one exemplary embodiment of an MPSK modulation classifier 1410.
Figure 33:
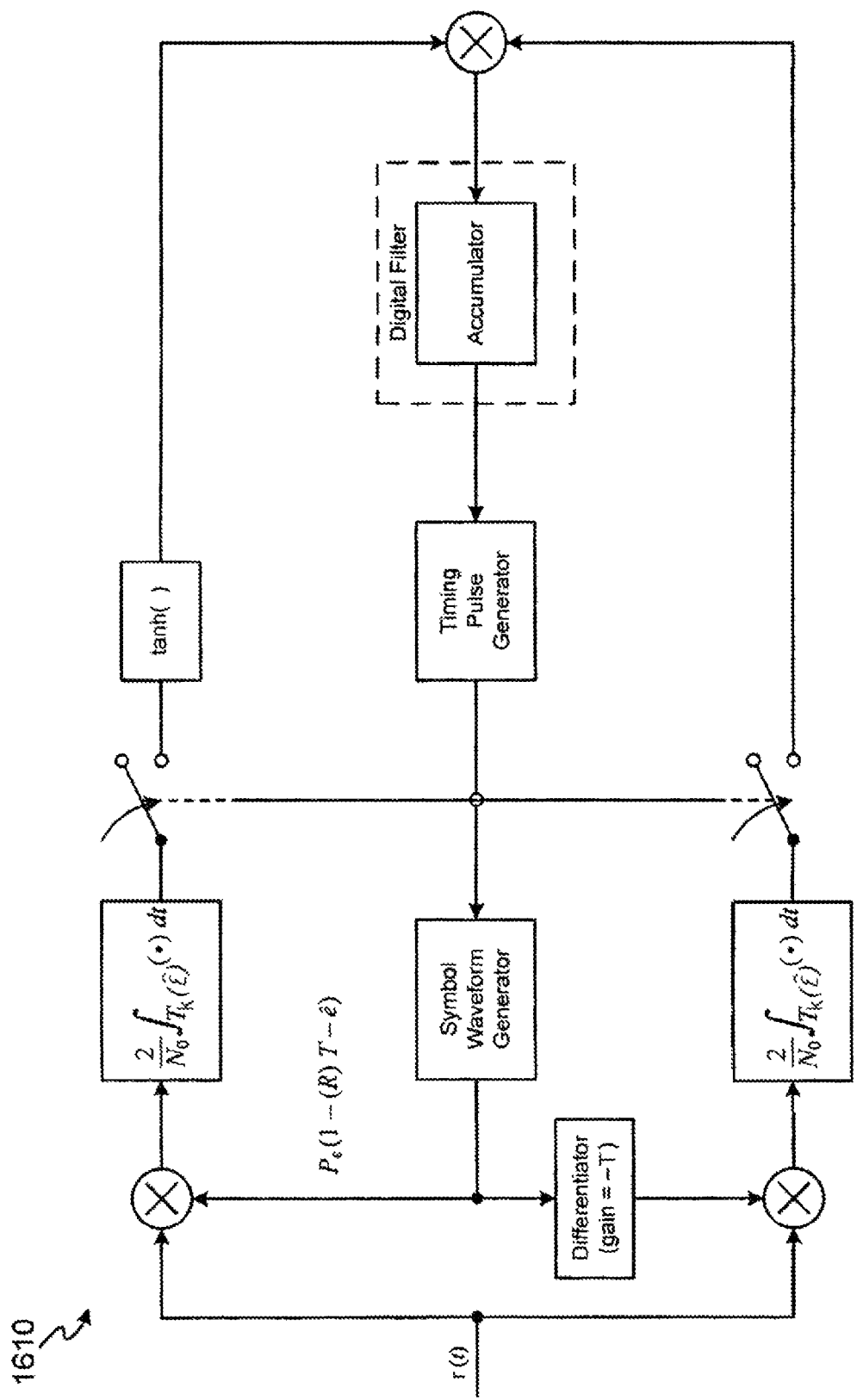
FIG. 33 is a block diagram of a high SNR data transition tracking loop (DTTL) 1620.

FIG. 32 is a block diagram of one exemplary embodiment of a modulation classifier 1410. It is the qLLR modulation classifier. Beginning with a quasi-log-likelihood ratio (qLLR) approximation, and the further approximation $I_0(x) \cong e^x$, valid for large x, (high post-detection SNR) leads to the approximate threshold:

$$T = \frac{N(2P_t)^{M/2}}{2} \quad (34)$$

This approximate threshold actually outperforms the "optimum" threshold for symbol SNR's above 4 dB.

Alternatively, in another exemplary embodiment the qLLR metric 1410 may be modified by normalizing its magnitude, resulting in the nqLLR metric:

$$nqLLR = \frac{\left|\sum_{n=0}^{N-1} \tilde{r}_n^M\right|}{\sum_{n=0}^{N-1} |\tilde{r}_n|^M}$$

The analytical derivation of appropriate thresholds for the qLLR in (34) depended on the particular form of the metric, and involved some approximation. As an alternative, an empirical method to optimize the threshold can be used for any classifier metric, including the qLLR and nqLLR metrics is disclosed. Empirical threshold determination consists of the following process:

1. Generate a large number of received noisy M-PSK and M'-PSK samples;
2. Group the samples into blocks of length N, and compute a set of sample classifier metrics for the qLLR classifier);
3. Sort the metrics for M-PSK and M'-PSK received symbols separately, in order of increasing value;
4. For each observed metric of value a, in increasing order:
    (a) Count the number of observed M-PSK metrics having value less than a,
    (b) Count the number of observed M'-PSK metrics having value greater than a, and
    (c) Compute the probability of misclassification when using threshold a, using the sum of the above counts; and
5. Report the threshold that minimizes the probability of misclassification.

This procedure may be implemented efficiently enough that a desktop machine can generate about 100 million samples and determine an empirically optimum threshold in less than an hour. The following additional points should be noted:

1. Threshold optimization need be performed once, offline. In a practical implementation, given N and $y_s$ a table look-up may be used to determine the threshold.

2. The optimum threshold for the LR metric and its approximation in (344) is zero, and requires no empirical optimization.

3. The optimum threshold for the qLLR metric for BPSK/QPSK classification is relatively flat over a broad region of $\gamma_s$ being near 0.6 for $\gamma_s > -5$ dB. This is a desirable characteristic, because $\gamma_s$ may not be known exactly.

4. The optimum threshold for the nqLLR metric is also quite flat, and ranges from about 0.15 to 0.6 for $-10 < \gamma_s < 10$. At high SNR, it is approximately equal to the optimum qLLR/$(2NP_t)$ threshold, because the qLLR/$(2NP_t)$ metric and the nqLLR metric are nearly identical in that region. Thus, the nqLLR and qLLR classifiers have similar performance, and the nqLLR has the advantage that neither $P_t$ nor $\sigma^2$ need be known.

Thus far exact and approximate likelihood-based non-coherent classifiers of M-PSK signals have been discussed under the assumption of unknown (uniformly distributed) carrier phase, but with perfectly known fractional symbol timing. In other embodiments these classifiers are extended to the case where the symbol timing is unknown and also uniformly distributed To simplify the implementation of the ML classifiers, in one embodiment, approximations of the nonlinearities involved in their definitions are used in much the same way as was done for the conventional (non-offset) modulations. The approximate LLF is:

$$LLF_{4'} = \frac{P_t}{4\sigma^4} \sum_{n=0}^{N-1} [|\tilde{r}_{I_n}|^2 + |\tilde{r}_{Q_n}|^2] + \ln I_0\left(\frac{P_t}{4\sigma^4}\left|\sum_{n=0}^{N-1}(\tilde{r}_{I_n}^2 - \tilde{r}_{Q_n}^2)\right|\right) \quad (35)$$

For BPSK), the following LLF is obtained:

$$\tan hx \approx \operatorname{sgn} x \quad (36)$$

where again $x_n(0; \theta_c) = x_{In}(\theta_c)$ since in this case $x_{Qn}(\theta_c) = 0$.

To get to the final simplification, the approximation $I_n$ $I_0(x) \cong x$ $(x \gg 1)$ is applied to result in the qLLR:

$$qLLR' = \frac{P_t}{4\sigma^4}\left[\sum_{n=0}^{N-1}[|\tilde{r}_{I_n}|^2 - |\tilde{r}_{Q_n}|^2] + 2\left|\sum_{n=0}^{N-1}\tilde{r}_{I_n}^2\right| - \left|\sum_{n=0}^{N-1}(\tilde{r}_{I_n}^2 - \tilde{r}_{Q_n}^2)\right|\right] \quad (37)$$

The operation and performance of various receiver functions can be quite sensitive to knowledge of the timing (data transition epochs) of the received data symbols. Thus, the ability to accurately estimate this parameter and continuously update the estimate (i.e., perform symbol synchronization) with as little knowledge of other parameters is important to successful operation of a radio receiver 100.

Traditionally, symbol synchronization techniques have been developed assuming that the data symbols are binary, the modulation format (e.g., NRZ or Manchester data) is known a priori, and carrier synchronization is perfect. Thus, the symbol synchronization problem has been solved entirely at baseband assuming perfect knowledge of the carrier phase and frequency.

Since radio receiver 100 functions, in general, over a wide range of SNRs, in one exemplary embodiment, radio receiver 100 employs symbol timing estimation and tracking schemes whose implementations can adapt themselves to this changing environment using the knowledge obtained from SNR module 134. Furthermore, since SNR module 134 itself requires knowledge of symbol timing, circuitry for obtaining a coarse estimate of this timing is important.

In one embodiment, FSS 160 includes a DTTL is motivated by an open loop estimate to determine the MAP estimate of the symbol timing based on an observation of a block of N symbols. Analogous to the ML approach taken in modulation classification, the likelihood function (LF) of the received signal vector is formed conditioned on the unknown parameters to be estimated For the purpose of finding the MAP estimate of symbol synchronization alone, perfect knowledge of the carrier phase is assumed, and wherein $\theta_c = 0$. Under this assumption, the MAP estimate of symbol timing $\hat{\epsilon}_{MAP\ MAP}$ is given by:

$$\hat{\epsilon}_{MAP} = \operatorname*{argmax}_{\epsilon} \exp\left[\sum_{n=0}^{N-1} \ln\left(\frac{2}{M}\sum_{q=0}^{M/2-1}\cosh[x_n(q; \hat{\epsilon})]\right)\right] \quad (44)$$

where now:

$$x_n(q; \epsilon) = \frac{A}{\sigma^2}\operatorname{Re}\{\tilde{r}_n(\epsilon)e^{-j[2q+(1+(-1)^{M/2})/2]\pi/M}\}$$

$$= \frac{2\sqrt{P}}{N_0}\operatorname{Re}\left\{e^{-j[2q+(1+(-1)^{M/2})\pi/M]}\int_{(n+\epsilon)T}^{(N+1+\epsilon)T}\tilde{r}(t)p(t-nT-\epsilon T)dt\right\} \quad (45)$$

Note that the actual fractional symbol timing offset $\epsilon$ is embedded in the received complex baseband signal $\tilde{r}(t)$ and thus the difference between $\hat{\epsilon}_{MAP}$ and $\epsilon$ represents the normalized symbol timing error.

A closed-loop configuration that implements the expression in (446) as an error signal is referred to as a MAP Estimation Loop.

Figure 34:
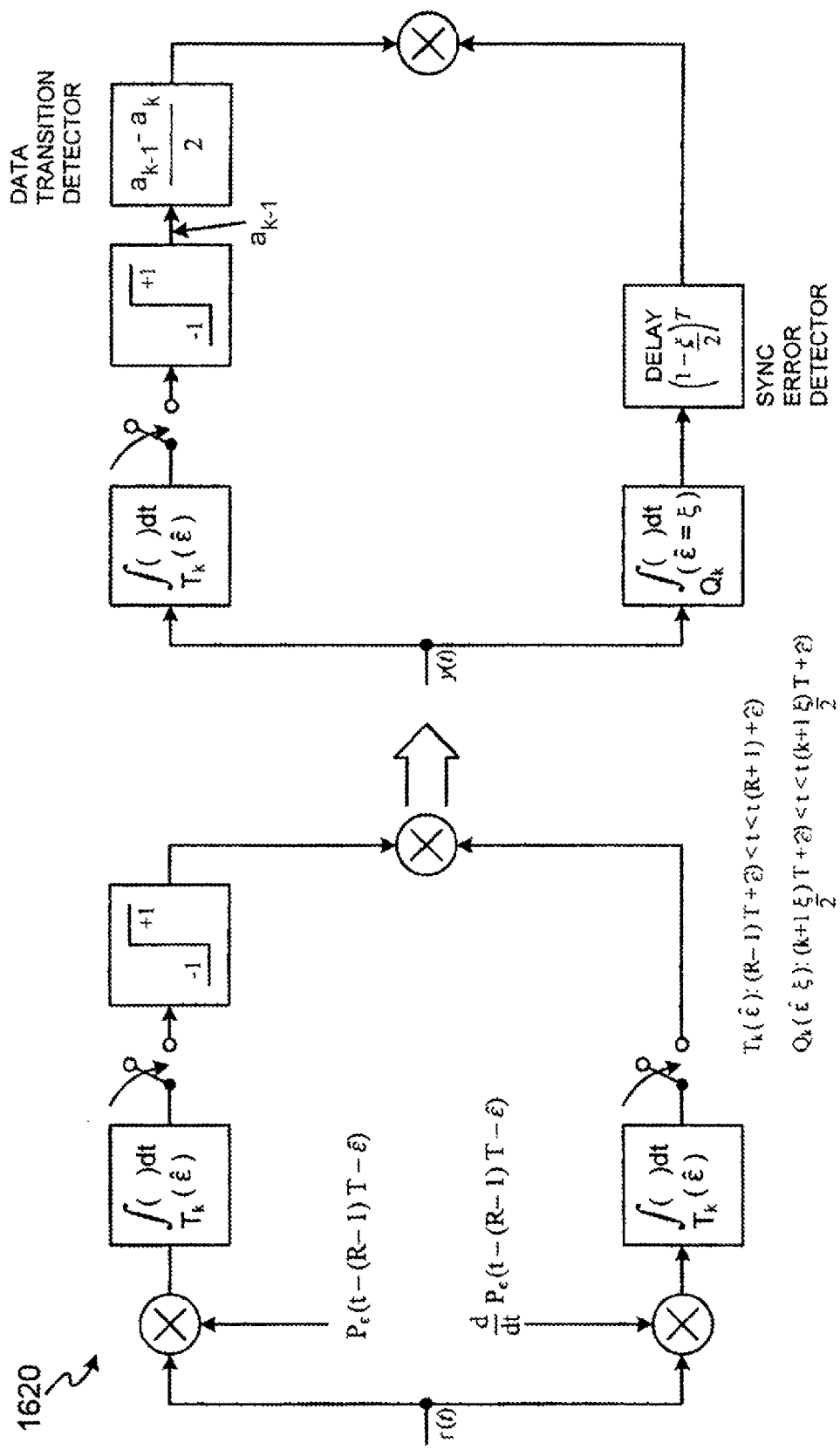
FIG. 34 is a block diagram of a MAP-motivated linear DTTL 1630.

For binary signals (M=2), the error signal of (45) simplifies to:

$$e = \sum_{n=0}^{N-1} \tanh[x_\pi(O; \hat{\epsilon})] \frac{d}{d\hat{\epsilon}} x_\pi(O; \hat{\epsilon}) \quad (46)$$

where:

$$x_\pi(0; \hat{\epsilon}) = \frac{2\sqrt{P}}{N_0}\int_{(n+\hat{\epsilon})}^{(n+1+\hat{\epsilon})} r(t)p(t-nT-\hat{\epsilon}T)dt$$

$$x'_\pi(0; \hat{\epsilon}) = \frac{2\sqrt{P}}{N_0}\int_{(n+\hat{\epsilon})}^{(n+1+\hat{\epsilon})} r(t)\frac{dp(t-nT-\hat{\epsilon}T)}{dt}dt$$

and r(t) is now a real signal. A block diagram of one embodiment of a MAP estimation loop 1610 that uses e of (46) as an error signal to control a timing pulse generator is illustrated in FIG. 34, wherein the shorthand notation $T_n(\hat{\epsilon})$ represents the time interval $(n+\hat{\epsilon})T \leq t \leq (n+1+\hat{\epsilon})T$. In FIG. 34, the accumulator represents the summation over N in (46). Thus, based on the above model, the loop would update itself in blocks of N symbols. In one embodiment, this block-by-block accumulator is replaced by a digital filter which updates the loop every T seconds, and whose impulse response is chosen to provide a desired dynamic response for the loop. The design of this filter and its associated closed-loop response characteristic are not dictated by the MAP estimation theory which explains the use of the term "MAP-motivated" when describing the MAP estimation loop.

To go from the MAP estimation loop to the conventional DTTL, one needs to approximate the hyperbolic tangent nonlinearity for large values of its argument, equivalently, at high SNR and 2) characterize, i.e., approximate, the derivative of the pulse shape required in (50). Specifically, for large values of its argument, one has the approximation:

$$\tan hx \approx \text{sgn} x \tag{51}$$

Figure 35:
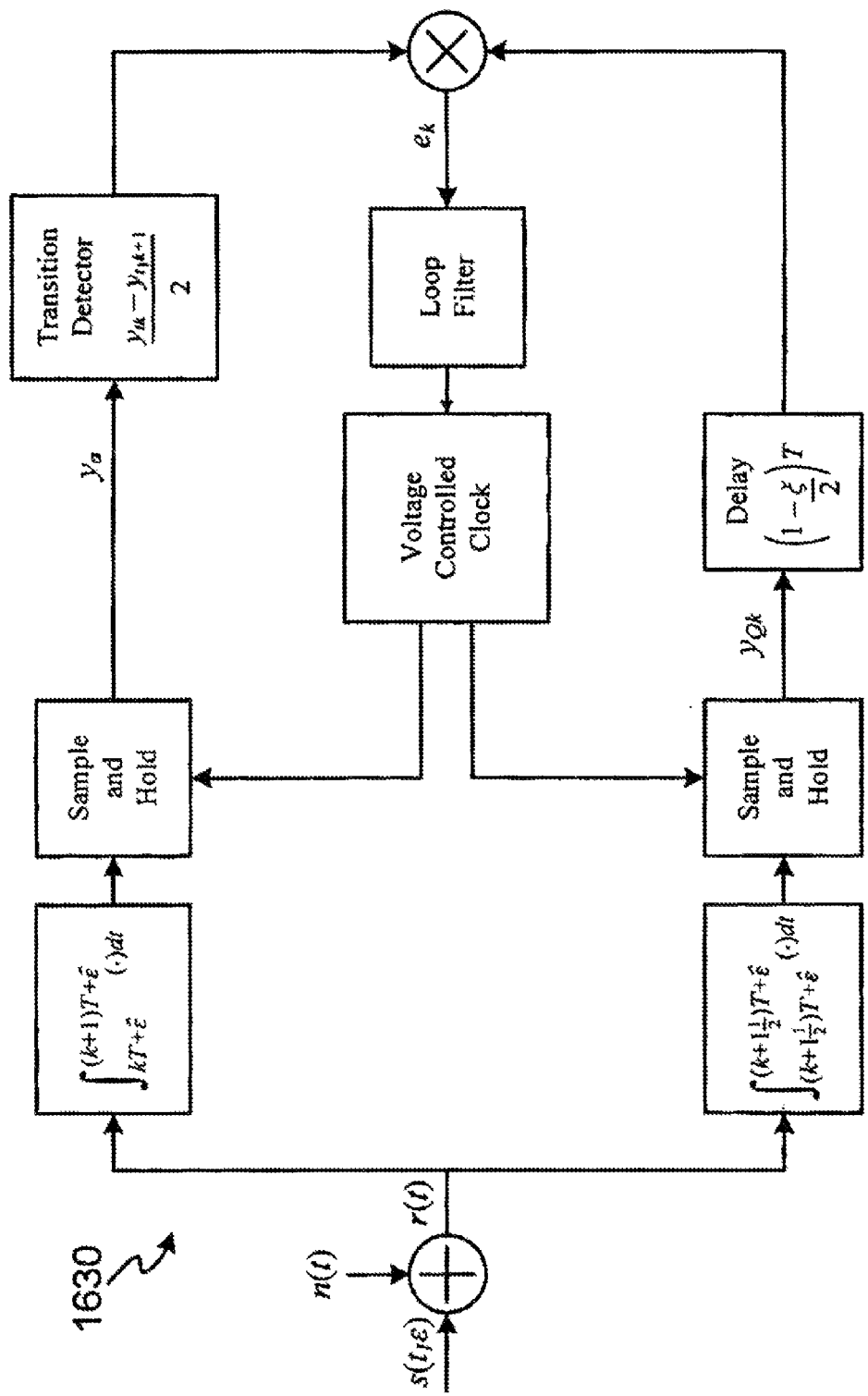
FIG. 35 is a block diagram of a maximum likelihood sliding-window estimator of symbol timing for an NRZ data stream.

Based on the above assumptions and discussion, it is now clear that the MAP estimation loop migrates to a DTTL 1620 as illustrated in the block diagram FIG. 35.

In one exemplary embodiment, FSS 160 includes a DTTL that is motivated by the MAP estimate of symbol timing at low SNR and, in particular, the I arm hard decisions are replaced by soft decisions whereupon in the limiting case, the hard limiter is replaced by a linear device. Under high SNR conditions where the nonlinearity is approximated as in (51), in one embodiment, the I arm of the resulting symbol synchronizer becomes a detector of a transition in hard decisions made on successive symbols. In accordance with one aspect of one embodiment, the DTTL includes a synchronizer that results from approximating the nonlinearity for small values of its arguments as appropriate at low SNR.

For sufficiently small values of its argument, the hyperbolic tangent nonlinearity can be approximated by:

$$\tan hx \approx \text{sgn} x \tag{52}$$

(i.e., a linear function). Under this assumption, a MAP-motivated closed-loop synchronizer 1630 is illustrated in the block diagram of FIG. 35, and its performance is analyzed as follows. After known carrier phase demodulation by the carrier reference $\sqrt{2}\cos(\omega_c t + \theta_c)$, the baseband signal input to the LDTTL is given by:

$$r(t) = s(t, \varepsilon) + n(t), \; s(t, \varepsilon) = \sqrt{P} \sum_{n=-\infty}^{\infty} d_n p(t - nT - \varepsilon T) \tag{53}$$

where, consistent with the assumption of NRZ data, p(t) is a unit amplitude rectangular pulse of duration T sec and $\{d_n\}$ is an iid±1 sequence with $d_n$ representing the polarity of the nth data symbol. The additive noise is a white Gaussian process with single-sided power spectral density $N_0$ W/Hz. The local clock produces a timing reference for the I and Q I&D filters that depends on its estimate $\hat{\epsilon}$ of $\epsilon$.

Figure 36:
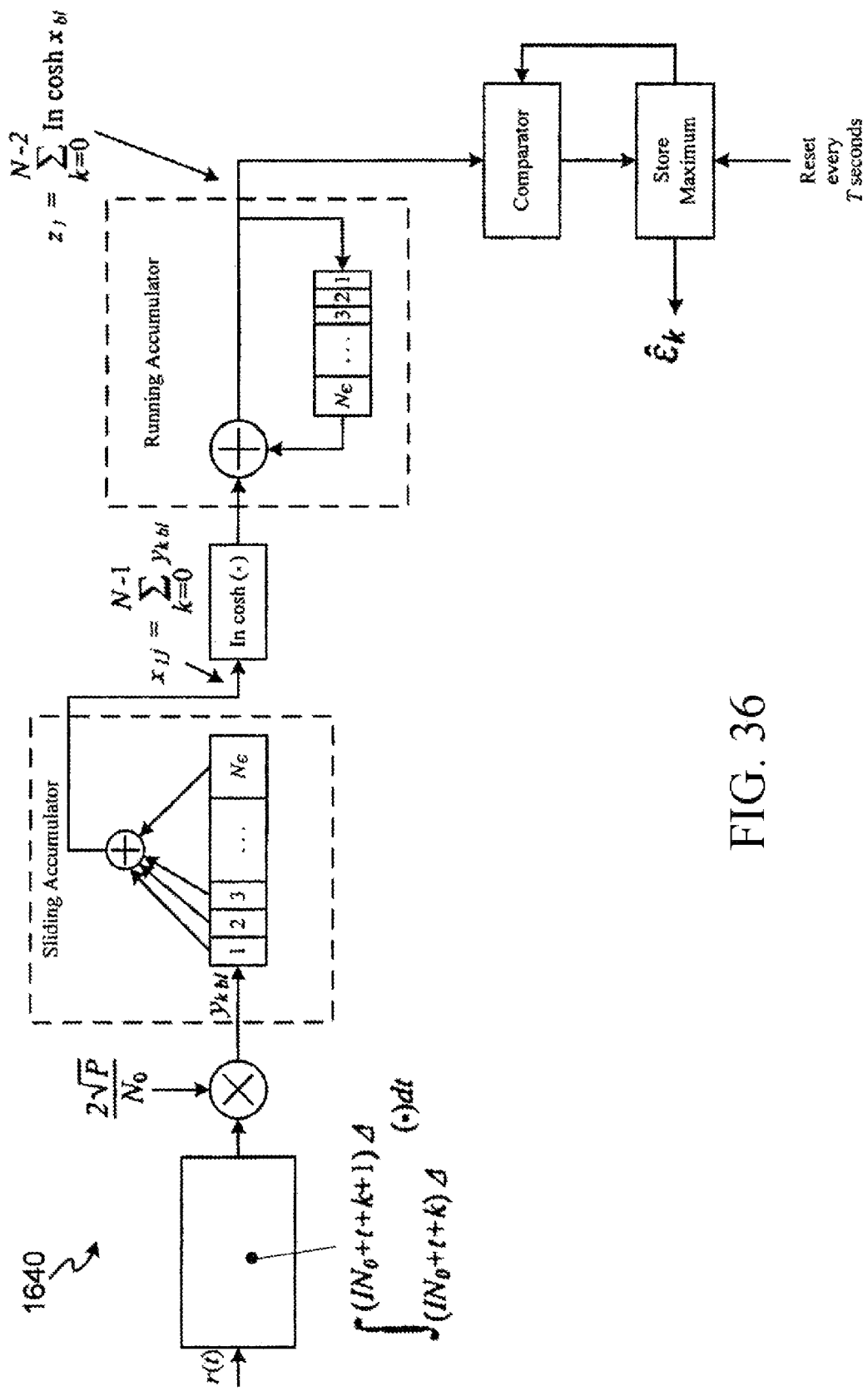
FIG. 36 is a block diagram of a weighted running accumulator.
Figure 37:
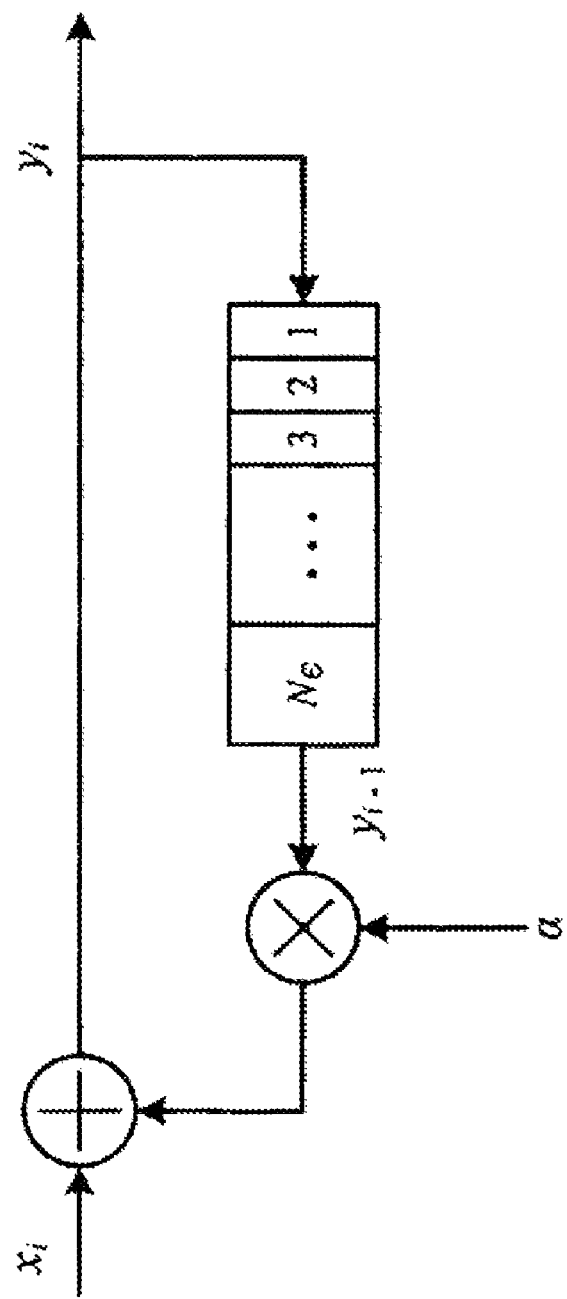
FIG. 37 is a block diagram of a weighted running accumulator 1650.
Figure 38:
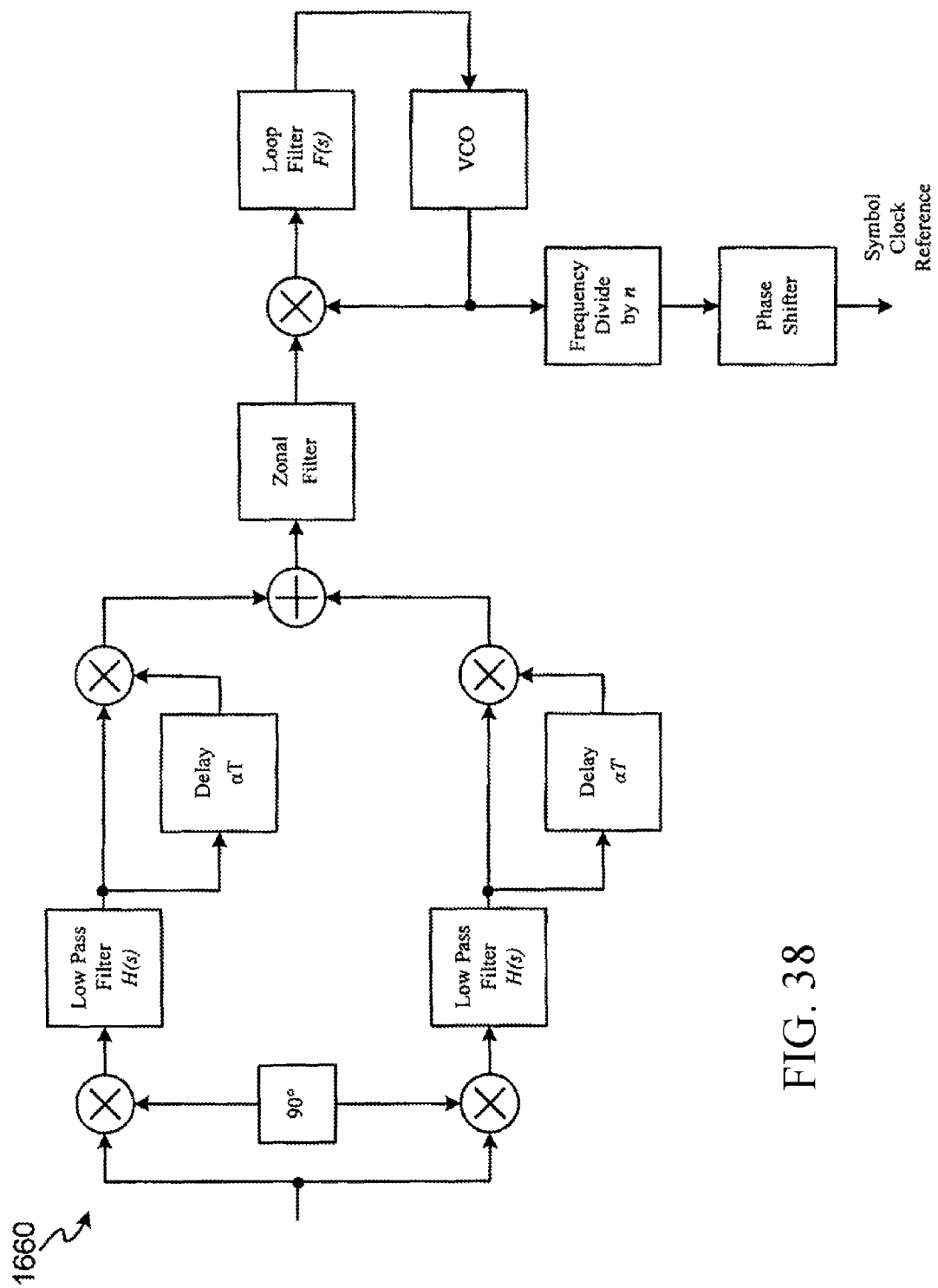
FIG. 38 is block diagram of a real non-coherent version of a cross-spectrum synchronizer 1660.

One can immediately apply the same small and large argument approximations to the hyperbolic tangent nonlinearity and, analogous to FIGS. 35 and 36, arrive at DTTL-like implementations which are illustrated in the block diagrams of FIGS. 37 and 38.

As discussed above, open loop MAP estimation of symbol epoch involves finding the conditional (on the symbol timing) likelihood function of the received signal based on a single observation of the received signal over a block of symbols. Furthermore, since the unknown symbol epoch is assumed to be uniformly distributed over the symbol interval, the MAP estimate is equivalent to the ML estimate. Moreover, the traditional closed-loop estimation scheme motivated by the MAP estimation approach employs an error signal derived from the derivative of the CLF that can be updated at intervals corresponding to the symbol time. Since for rectangular pulses (e.g., an NRZ data stream) the derivative of the CLF, which is related to the derivative of the pulse shape, is undefined, closed-loop structures motivated by the MAP estimation approach generally do not exist. Nevertheless, with suitable approximations of the derivative of the pulse shape, such a closed loop (e.g., the DTTL) will in fact provide symbol synchronization for an NRZ data stream with rectangular pulses. The closed-loop approach provides a continuous updating (tracking) of the symbol timing (once per bit interval) which is desirable in the presence of channel dynamics whereas the open approach is usually regarded as either a one shot estimator (i.e., compute the MAP or MMS estimate based on a single observed long block of data), or a block-by-block estimator where the single shot is sequentially repeated over and over.

What is important to observe is that the open loop estimation techniques can be modified to provide sequential updates at the symbol rate to the symbol timing epoch estimates and as such resemble the closed-loop techniques with however, improved performance. As such, the presented invention includes a sequential digital implementation of the MAP estimation of symbol epoch that can track the dynamics in this parameter yet provide a performance approaching that of the true optimum MAP estimation technique.

Because of the assumption that the unknown parameter being estimated (i.e., symbol epoch) is constant over the observation, the implementation in FIG. 36 (referenced as 1640) includes a running accumulator with uniform weighting. In other embodiments where the parameter is dynamic but slowly varying, one can assume that the unknown parameter is constant over a finite number of symbol intervals. As such, the uniform running accumulator is replaced with a weighted running accumulator which reflects a fading memory and is analogous to what is done in a closed-loop architecture by using a digital filter following the error signal. This embodiment (referenced as 1650) is illustrated in the block diagram of FIG. 37, wherein the feedback term is multiplied by a constant $\alpha<1$. This achieves a running accumulator with a geometric weighting which has the input-output characteristic:

$$y_i = \sum_{m=0}^{\infty} \alpha^m x_{i-m} \tag{55}$$

Since the running accumulator also accomplishes the data detection (matched filter) function, then the epoch estimate index, $\hat{i}_N$ of (55) may be used to determine in each symbol interval which running accumulator output to use for making a hard decision on that symbol.

When the pulse shape is other than rectangular, the modification that allows the bank of $N_c^-$ correlations to be replaced by a sliding accumulator as in FIG. 36 is not possible. However, if $N_\epsilon$ is large and the pulse shape is approximated by a piecewise constant staircase function with $N_\epsilon$ steps, then the correlation of the received signal and the pulse shape in a quantization interval can be written as:

$$\int_{i\Delta}^{(i+1)\Delta} r(t)p(t)dt = p_i \int_{i\Delta}^{(i+1)\Delta} r(t)dt \tag{56}$$

where $p_i$ is the assumed constant value of p(t) in the interval $i\Delta \leq t \leq (i+1)\Delta$. In view of (56), one modification of FIG. 34 that is necessary to allow for the inclusion of an arbitrary pulse shape is to replace the uniform sliding accumulator with a weighted sliding accumulator (see FIG. 36) where the weights are equal to the piecewise constant values of p(t). Furthermore, for sufficiently large $N_\epsilon$, one can approximately replace the integral of over the quantization interval by the value of r(t) at the midpoint of this interval times the duration of this interval, $\Delta$. As such, the integrator at the input of FIG. 34 can be replaced simply by a uniform sampler at rate $1/\Delta$.

In addition to "optimum" symbol synchronizers, such as the ones discussed thus far that are motivated by the MAP estimation approach, the present invention encompasses other embodiments for determining the symbol timing. A block diagram of a real non-coherent version of a cross-spectrum synchronizer 1660 is illustrated in the block diagram of FIG. 38, wherein the input is a bandpass signal whose signal component is given by $s^2(t,\epsilon) = \text{Re}\{\tilde{s}(t,\epsilon)e^{j\omega_c t}\}$, with $\omega_c$ denoting the carrier frequency.

Figure 39:
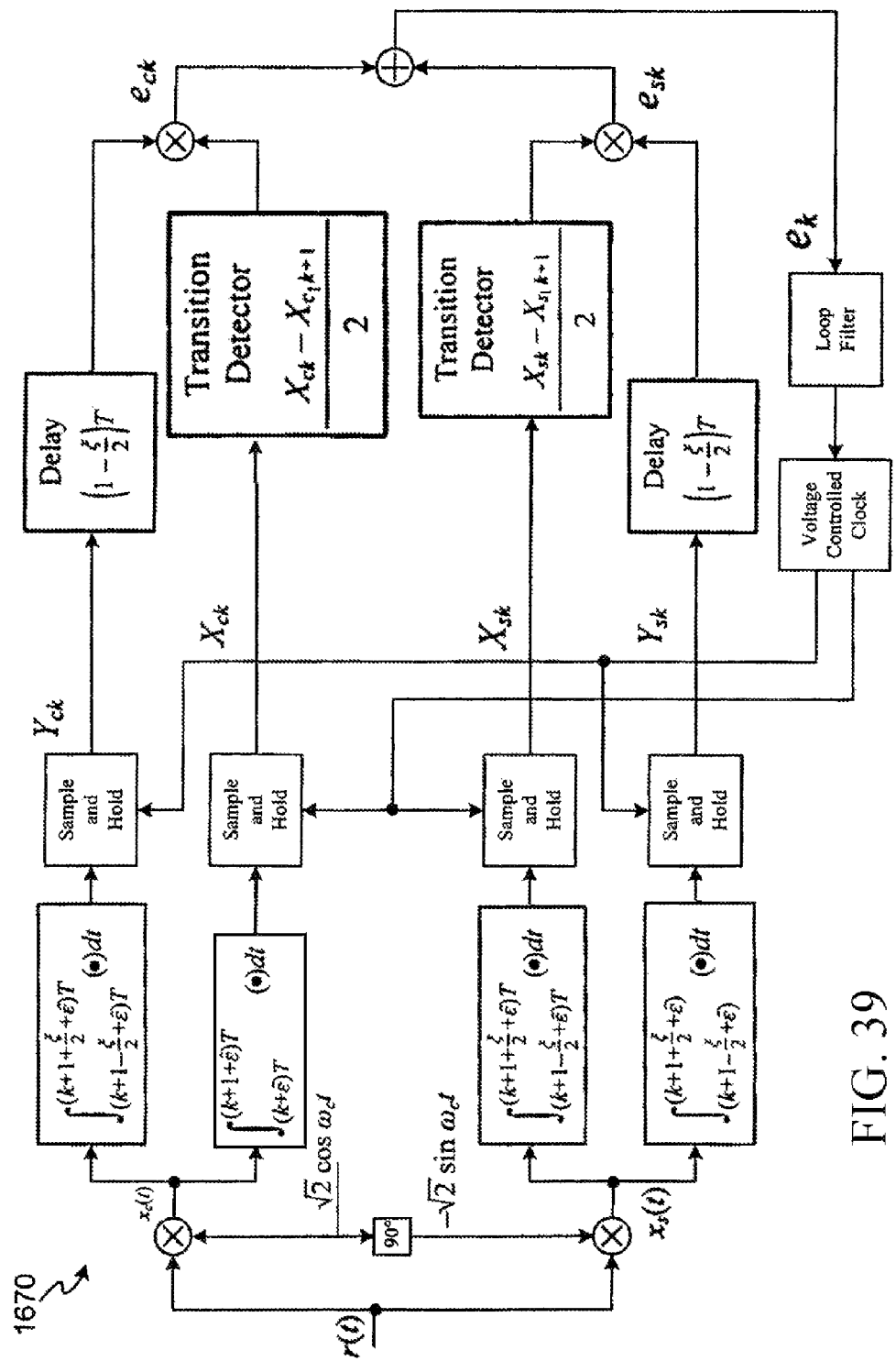
FIG. 39 is a block diagram illustrating NC-LDTTL 1670.

Another exemplary embodiment of FSS 160 includes non-coherent versions of a DTTL. The low SNR version of the noncoherent DTTL, herein given the acronym NC-LDTTL is a parallel combination of two independent coherent LDTTLs acting on the I and Q baseband signals. FIG. 39 is a block diagram illustrating NC-LDTTL 1670. In one exemplary embodiment, it is important that a coarse estimate of symbol timing be provided to SNR module 134, and is derived from the same statistics as used to form this estimator itself.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of the invention. All structural, chemical, and functional equivalents to the elements of the above-described exemplary embodiments that are known to those of ordinary skill in the art are expressly incorporated herein by reference and are intended to be encompassed by the invention.

The invention claimed is:

1. A method for autonomously receiving and decoding incoming signals of a variety of signal types without a priori knowledge of the defining characteristics of the incoming signals, comprising the steps of:
   receiving a signal of unknown signal type;
   making a first maximum likelihood estimate of a defining characteristic of said unknown signal type;
   utilizing said first estimate to make a second maximum likelihood estimate of another defining characteristic of said unknown signal type;
   selecting an appropriate decoder based on said first and second estimates; and
   decoding said signal with the selected decoder.

2. The method for autonomously receiving and decoding incoming signals of a variety of signal types without a priori knowledge of the defining characteristics of the incoming signals according to claim 1, wherein said step of making the first maximum likelihood estimate comprises a substep of making a maximum likelihood estimate of a modulation index of said received a signal of unknown signal type.

3. The method for autonomously receiving and decoding incoming signals of a variety of signal types without a priori knowledge of the defining characteristics of the incoming signals according to claim 2, wherein said substep of making a first maximum likelihood estimate further comprises a substep of tracking an offset frequency of said received signal of unknown signal type and outputting a signal having an estimated corrected frequency based on the incoming signal and the estimated likelihood estimate of the modulation index of said received a signal of unknown signal type.

4. The method for autonomously receiving and decoding incoming signals of a variety of signal types without a priori knowledge of the defining characteristics of the incoming signals according to claim 3, wherein said step of making a first maximum likelihood estimate further comprises a substep of mixing the received signal of unknown signal type with the outputted signal having an estimated corrected frequency.

5. The method for autonomously receiving and decoding incoming signals of a variety of signal types without a priori knowledge of the defining characteristics of the incoming signals according to claim 4, wherein said step of making a first maximum likelihood estimate further comprises a substep of deriving approximations of a maximum likelihood modulation classification based on said mixed signal from said mixing substep.

6. The method for autonomously receiving and decoding incoming signals of a variety of signal types without a priori knowledge of the defining characteristics of the incoming signals according to claim 3, further comprising a step or tracking a carrier phase of said received signal of unknown signal type.

7. A system for receiving and decoding incoming signals without a priori knowledge of any defining characteristics of the incoming signals types, comprising:
   a radio receiver adapted to receive an incoming signal, said radio receiver including,
   a first estimator for making a first maximum likelihood estimate of a defining characteristic of said incoming signal,
   a second estimator for utilizing the first maximum likelihood estimate to make a second maximum likelihood estimate of another defining characteristic of said incoming signal,
   a decoder selector for selecting an appropriate decoder scheme based on said first and second maximum likelihood estimates, and
   at least one decoder for implementing the selected decoder scheme to thereby decode said signal.

8. The system for receiving and decoding incoming signals according to claim 7, wherein said receiver further comprises a modulation index module for making a first maximum likelihood estimate of a modulation index of said incoming signal.

9. The system for receiving and decoding incoming signals according to claim 8, wherein said receiver further comprises a frequency correction module in communication with said modulation index module for tracking an offset frequency of said incoming signal and for outputting a signal having an estimated corrected frequency based on the incoming signal and the estimated modulation index from said modulation index module.

10. The system for receiving and decoding incoming signals according to claim 9, wherein said receiver further comprises a multiplier for mixing the incoming signal with the outputted signal having an estimated corrected frequency from the frequency correction module.

11. The system for receiving and decoding incoming signals according to claim 10, wherein said receiver further comprises a joint data rate estimator, signal-to-noise ratio estimator, pulse shape classifier, and symbol timing estimator.

12. The system for receiving and decoding incoming signals according to claim 11, wherein said receiver further comprises a modulation classifier module for deriving approximations of a maximum likelihood modulation classification based on said mixed signal from said multiplier and the outputted signal with estimated corrected frequency.

13. The system for receiving and decoding incoming signals according to claim 12, wherein said receiver further comprises a carrier synchronization module for tracking a carrier phase of said incoming signal.

14. The system for receiving and decoding any of a variety of incoming signals of various signal types according to claim 13, wherein said at least one decoder further comprises a plurality of decoders, said receiver selecting an appropriate decoder based on said first and second maximum likelihood estimates to thereby decode said signal.

* * * * *